(12) United States Patent
Ishibe

(10) Patent No.: US 7,646,523 B2
(45) Date of Patent: Jan. 12, 2010

(54) OPTICAL SCANNING APPARATUS AND IMAGE FORMING APPARATUS USING SAME

(75) Inventor: Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 11/621,158

(22) Filed: Jan. 9, 2007

(65) Prior Publication Data

US 2007/0188839 A1 Aug. 16, 2007

(30) Foreign Application Priority Data

Feb. 15, 2006 (JP) ............................. 2006-038155

(51) Int. Cl.
*G02B 26/08* (2006.01)

(52) U.S. Cl. .............. 359/215.1; 359/205.1; 359/213.1; 347/259

(58) Field of Classification Search ............... None
See application file for complete search history.

(56) References Cited

U.S. PATENT DOCUMENTS

| | | |
|---|---|---|
| 4,859,846 A | 8/1989 | Burrer |
| 5,543,956 A | 8/1996 | Nakagawa et al. |
| 7,177,060 B2 | 2/2007 | Nomura et al. |
| 2002/0030879 A1 * | 3/2002 | Hayashi ...................... 359/196 |

FOREIGN PATENT DOCUMENTS

| | | |
|---|---|---|
| CN | 1641403 A | 7/2005 |
| EP | 0836106 A | 4/1998 |
| EP | 1431797 A | 6/2004 |
| EP | 1557710 A | 7/2005 |
| EP | 1564577 A | 8/2005 |
| EP | 1566956 A | 8/2005 |
| JP | 2003-043393 A | 2/2003 |
| JP | 2003-279879 A | 10/2003 |
| JP | 2004-191416 | 7/2004 |
| WO | 2005-063613 A | 7/2005 |

* cited by examiner

*Primary Examiner*—James Phan
(74) *Attorney, Agent, or Firm*—Cowan, Liebowitz & Latman, P.C.

(57) ABSTRACT

An optical scanning apparatus allowing reduction in the size of the overall apparatus and the size of an imaging optical system LB with the use of an optical deflector that swings back-and-forth and an image forming apparatus using such an optical scanning apparatus, comprising: light source means; a condense optical system that condenses a light beam emitted from the light source means; an optical deflector that deflects the light beam emergent from the condense optical system; and an imaging optical system that images the light beam deflected by a deflection surface of the optical deflector on a scanning surface, wherein the optical deflector has a function of moving the deflection surface back-and-forth, the light beam emergent from the condense optical system converges in a sub-scanning cross section, and the convergence position is on the light source side of the deflection surface.

9 Claims, 12 Drawing Sheets

OPTICAL SCANNING APPARATUS AND IMAGE FORMING APPARATUS USING SAME

BACKGROUND OF THE INVENTION

1. Field of the Invention

The present invention relates to an optical scanning apparatus and an image forming apparatus using the same. The present invention is suitably applied to image forming apparatuses such as digital copying machines, multi function printers and laser beam printers (LBP) using an electrophotography process.

2. Description of the Related Art

Various optical scanning apparatuses that use, as an optical deflector for reflecting and deflecting a light beam, one that moves or swings back and forth have been conventionally proposed (see for example, Japanese Patent Application Laid-Open No. 2004-191416).

Optical scanning apparatuses using an optical deflector that swings back and forth are advantages, for example, in that the size of the optical deflector can be made much smaller and electric power consumption is low, as compared to optical scanning apparatuses that use, as an optical deflector, a multi-face rotating mirror such as a polygon mirror. In particular, optical deflectors made of a Si single crystal manufactured using a semiconductor process are advantageous in that they are theoretically free from metal fatigue and have excellent durability.

In the technology disclosed in Japanese Patent Application Laid-Open No. 2004-191416, the width, with respect to the main scanning direction, of a light beam incident on an optical deflector that oscillates sinusoidally is designed to be longer than the width, with respect to the main scanning direction, of the optical deflector, whereby the deflection surface of the optical deflector is used efficiently. With this feature, the spot diameter is intended to be made smaller, and an optical scanning apparatus in which adjustment of the position of an incident optical system can be eliminated is realized.

The deflecting surface of the optical deflector such as the deflection means that oscillates sinusoidally is a single surface, unlike with rotary multi-face mirrors that are widely used.

On the other hand, in multi-face rotating mirrors that are generally used, the plurality of deflection surfaces are arranged to be perpendicular to the main scanning direction. However, if an optical face tangle error occurs in a deflection surface with respect to the sub scanning direction due to, for example, a manufacturing error, the spot on a photosensitive drum is displaced in the sub scanning direction.

To correct the displacement, in current imaging optical systems, an anamorphic optical system called an optical face tangle error correction optical system in which the deflection surface and the surface to be scanned are arranged to be conjugate with each other is used.

In the optical face tangle error correction optical system, the deflection surface and the surface to be scanned are arranged in a conjugate relationship in the sub scanning cross section. Accordingly, if the position of the imaging lens that constitutes the imaging optical system is shifted toward the deflection surface with the intention of reducing its size, the imaging magnification in the sub scanning cross section becomes high, which leads to the problem that the sensitivity of the positioning of the imaging optical system is likely to become high.

In the case where the imaging lens that constitutes the imaging optical system is made of a plastic material with which the lens can be manufactured easily, focus errors in the sub scanning direction can occur due to changes in the refractive index of the lens material caused by increases in the temperature of the apparatus.

The defocus amount increases with an increase in the imaging magnification in the sub scanning cross section. Therefore, in the case where the imaging lens is made of a plastic material, it is very difficult to make the position of the imaging lens closer to the deflection surface to reduce the size.

SUMMARY OF THE INVENTION

An object of the present invention is to provide an optical scanning apparatus using an optical deflector that swings back and forth that allows a reduction in the size of the overall apparatus and a reduction in the imaging optical system and to provide an imaging optical system using such an optical scanning apparatus.

According to one aspect of the invention, an optical scanning apparatus comprises light source means, a condense optical system that condenses a light beam emitted from said light source means, an optical deflector that deflects a light beam emergent from said condense optical system for scanning; and an imaging optical system that images the light beam deflected by a deflection surface of said optical deflector on a surface to be scanned, wherein said optical deflector has a function of moving the deflection surface back and forth in a main scanning direction, and the light beam emergent from said condense optical system converges in a sub scanning cross section, the convergence position being in an optical path between said condense optical system and the deflection surface of the optical deflector.

According to a further aspect of the invention, the optical scanning apparatus further includes a mirror provided in an optical path between said condense optical system and said optical deflector, wherein the following condition is satisfied:

$$L1 \times \beta \leq 11.46 \text{ (mm)}$$

where L1 (mm) represents the distance from the mirror to the convergence position of the light beam emergent from the condense optical system in the sub scanning cross section, and β represents the imaging magnification of said imaging optical system in the sub scanning cross section.

According to a further aspect of the invention, in the optical scanning apparatus, the following condition is satisfied:

$$L2 \text{(mm)} = 0.61 \frac{D}{\lambda \beta}$$

where, L2 (mm) represents the distance from the convergence position of the light beam emergent from the condense optical system in the sub scanning cross section to the deflection surface of said optical deflector, β represents the imaging magnification of said imaging optical system in the sub scanning cross section, D (mm) represents the diameter of an image spot focused on said surface to be scanned in the sub scanning direction, and λ represents the wavelength of the light beam emitted from said light source means.

According to a further aspect of the invention, in the optical scanning apparatus, said imaging optical system has at least one imaging optical element made of plastic.

According to a further aspect of the invention, in the optical scanning, said optical deflector is a resonance optical deflector in which the deflection surface of the optical deflector is driven by resonance drive.

According to another aspect of the invention, an image forming apparatus comprises the optical scanning apparatus set out in the foregoing, a photosensitive member disposed at said surface to be scanned, a developing device that develops an electrostatic latent image formed on said photosensitive member by a light beam deflected by said optical scanning apparatus for scanning as a toner image, a transferring device that transfers the developed toner image onto a material to be transferred, and a fixing device that fixes the transferred toner image on the material to be transferred.

According to another aspect of the invention, an image forming apparatus comprises the optical scanning apparatus and a printer controller that converts code data input from an external device into an image signal and input it to said optical scanning apparatus.

According to the present invention, it is possible to provide an optical scanning apparatus using an optical deflector that swings back and forth that allows a reduction in the size of the overall apparatus and a reduction in the imaging optical system and to provide an imaging optical system using such an optical scanning apparatus.

Further features of the present invention will become apparent from the following description of exemplary embodiments with reference to the attached drawings.

DESCRIPTION OF THE EMBODIMENTS

Figure 1:
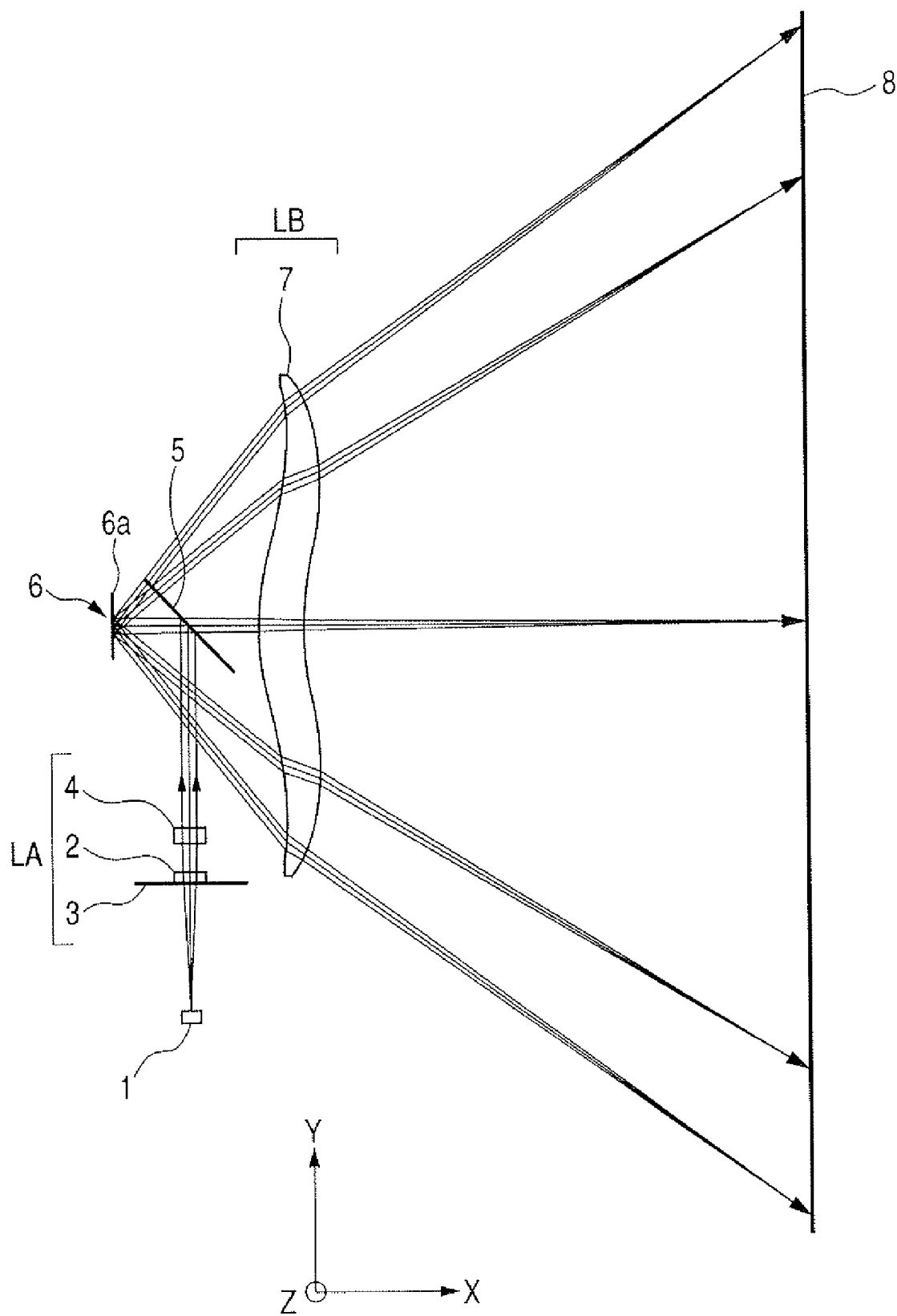
FIG. 1 is a cross sectional view of the relevant portion of an optical scanning apparatus according to a first embodiment of the present invention taken along the main scanning direction.

FIG. 1 is a cross sectional view in the main scanning direction showing the relevant portion in the first embodiment of the present invention.

In the following description, the term "main scanning direction" refers to the direction perpendicular to the deflection axis of the optical deflector and to the optical axis of the imaging optical system (i.e. direction in which a light beam is deflected by the optical deflector). The term "sub scanning direction" refers to the direction parallel to the deflection axis of the optical deflector. The term "main scanning cross section" refers to the plane including the main scanning direction and the optical axis of the imaging optical system. The term "sub scanning cross section" refers to a plane perpendicular to the main scanning cross section.

In FIG. 1, reference numeral 1 designates light source means in the form of, for example, a semiconductor laser. Reference numeral 3 designates an aperture stop, which regulates a light beam passing therethrough to shape the beam. Reference numeral 2 designates a collimator lens serving as a conversion optical system, which converts a divergent beam emitted from the light source means 1 into a parallel beam. Reference numeral 4 designates a cylindrical lens serving as condensing optical system, which has a predetermined power (refractive power) only within the sub scanning cross section (or in the sub scanning direction). The cylindrical lens 4 images the light beam that has been converted by the collimator lens 2 into a parallel beam in the sub scanning cross section onto a deflection surface 6a of an optical deflector 6 serving as deflection means (which will be described later) as a linear image. Reference numeral 5 designates a mirror serving as a reflection optical element, which deflects the light beam having passed through the cylindrical lens 4 in the main scanning direction to guide it to the optical deflector 6.

The collimator lens 3 and the cylindrical lens 4 are constituent elements of an incident optical system LA. The collimator lens 2 and the cylindrical lens 4 may be constructed integrally as a single optical element (an anamorphic lens).

The optical deflector 6 is constituted by a resonance optical deflector whose deflection surface 6a is adapted to sinusoidally oscillate back and forth by resonance.

In this embodiment, the deflection surface 6a of the optical deflector 6 swings back and forth, whereby the light beam emergent from the incident optical system LA is deflected in such a way as to scan the surface to be scanned 8 back and forth along the main scanning direction. The back-and-forth swing motion of the deflection surface 6a of the optical deflector 6 is realized by resonance drive of sinusoidal oscillation, or oscillation in which multiple types of sinusoidal oscillation are superimposed.

Reference sign LB designates an imaging optical system having an fθ characteristic. The imaging optical system LB has an imaging lens (fθ lens) 7 made of plastic material, the imaging lens 7 serving as an imaging optical element. The imaging optical system LB images, in the main scanning cross section, the light beam including image information that has been deflected by the optical deflector 6 for scanning onto the surface of a photosensitive drum 8 as a surface to be scanned.

The fθ lens 7 used in this embodiment has such a shape that when the deflection surface 6a of the optical deflector 6 deforms in the main scanning cross section with the back-and-forth swing motion, wavefront aberration in the main scanning cross section that is generated according to the deformation amount is reduced.

Reference numeral 8 designates the surface of the photosensitive drum 8 as the surface to be scanned In this embodiment, a divergent light beam that is emitted from the semiconductor laser 1 and modulated based on image information is shaped by the aperture stop 3 with respect to the beam width and the cross sectional shape thereof and converted into a parallel beam by the collimator lens 2.

Then, the beam is incident on the deflection surface 6a from the center of the oscillation angle (or deflection angle) of the optical deflector 6 in the main scanning cross section (right-in-front incidence), through the cylindrical lens 4 and the mirror 5. On the other hand, in the sub scanning cross section, the beam is incident on the deflection surface 6a with a certain angle relative to the sub scanning direction (oblique incidence).

The light beam deflected in the main scanning direction by the back-and-forth swing motion of the deflection surface 6a of the optical deflector 6 for scanning is guided onto the photosensitive drum surface 8 through the fθ lens 7. Thus, the photosensitive drum surface 8 serving as a recording medium is optically scanned in the main scanning direction with the back-and-forth swing motion of the deflection surface 6a of the optical deflector 6. In this way, an image is recorded on the photosensitive drum surface 8 as a recording medium.

As mentioned above, the optical deflector 6 used in this embodiment is constituted by a resonance optical deflector in which the deflection surface 6a sinusoidally oscillates back and force by resonance.

Here, the resonance optical deflector 6 will be described in detail in the following. The optical deflector 6 used in this embodiment has the structure illustrated in FIG. 2.

Figure 2:
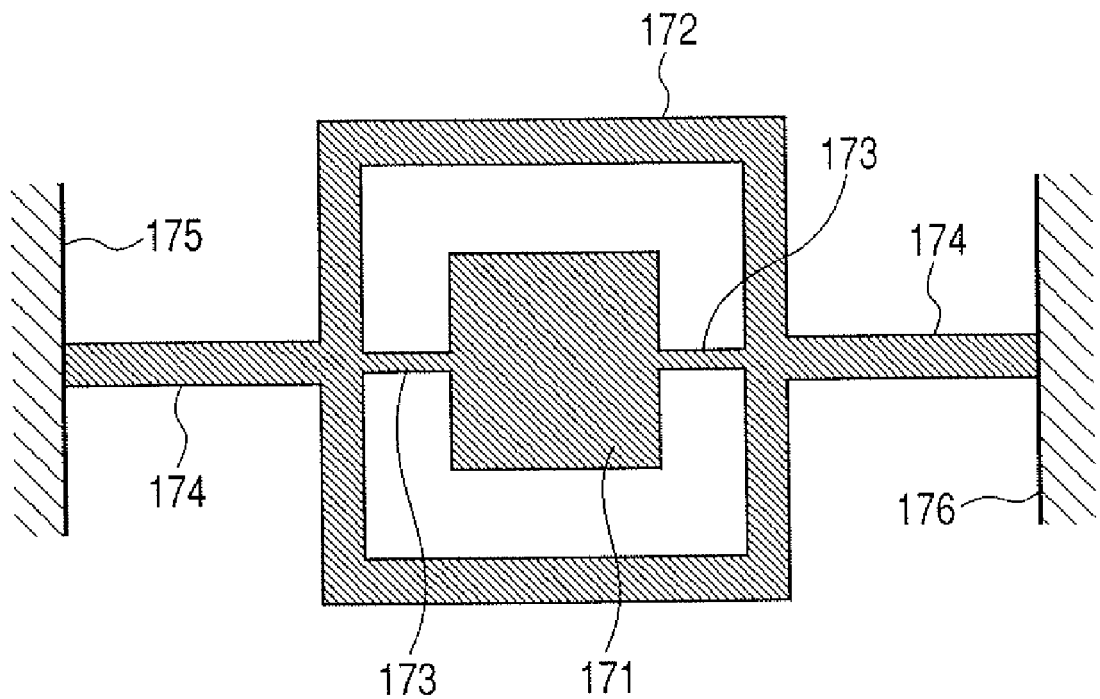
FIG. 2 illustrates the structure of an optical deflector used in the first embodiment of the present invention.

The optical deflector 6 shown in FIG. 2 has a plurality of movable plates 171 and 172 and plurality of torsion springs 173 and 174 integrally formed from a single plate. In this optical deflector 6, the torsion springs 173 and 174 are fixed on the support portions 175 and 176 respectively.

As will be understood from FIG. 2, torsion springs 173, 174 are coaxially aligned with each other. Movable plates 171, 172 are connected in series, so that the movable plates 171, 172 can oscillate about the axis of torsion of the torsion springs 173, 174.

On the movable plate 171 is provided a deflection surface 6a (not shown in FIG. 2) for deflecting and scanning a light beam. Thus, the light beam emitted from the light source means 1 is deflected with torsional oscillation of the movable plate 171 for scanning.

In the following, the operation principle of the optical deflector 6 having the above described structure will be described with reference to FIG. 3.

Figure 3:
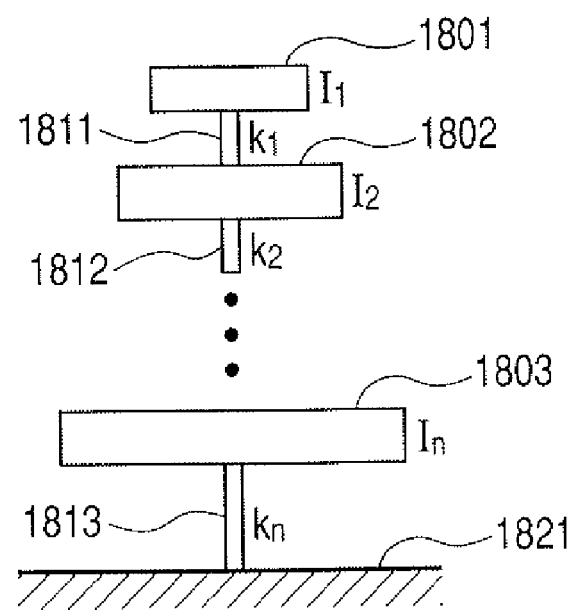
FIG. 3 is a diagram for illustrating the principle of the optical deflector used in the first embodiment of the present invention.

FIG. 3 is a diagram for illustrating the principle of the optical deflector 6 according to this embodiment. In FIG. 3, reference signs 1801 to 1803 designate n movable plates, reference signs 1811 to 1813 designate n torsion springs and reference sign 1821 designates a support portion. The torsion springs 1811 to 1813 are coaxially aligned with each other, and the movable plates 1801 to 1803 are adapted to oscillate about the axis of torsion of the torsion springs 1811 to 1813.

The equation of free oscillation of such a system is given as follows.

$$M\ddot{\theta} + K\theta = 0 \quad (1)$$

$$\theta = \begin{pmatrix} \theta_1 \\ \theta_2 \\ M \\ \theta_n \end{pmatrix}, M = \begin{pmatrix} I_1 & & & \\ & I_2 & & \\ & & O & \\ & & & I_n \end{pmatrix},$$

$$K = \begin{pmatrix} k_1 & -k_1 & & \\ -k_1 & k_1+k_2 & -k_2 & \\ & & O & \\ & & -k_{n-1} & k_{n-1}+k_n \end{pmatrix}$$

where,
$I_k$: moment of inertia of movable plate,
$K_k$: spring constant of torsion spring, and
$\theta_k$: torsion angle of movable plate (k=1, ..., n).

Letting $\lambda_k$ (k=1, ..., n) be eigenvalues of $M^{-1}K$ in this system, the angular velocities $\omega_k$ of the natural mode are given as follows.

$$\omega_k = \sqrt{(\lambda_k)} \quad (2)$$

In the case of the optical deflector 6 according to this embodiment, there are base frequencies and integer multiples thereof in these natural mode angular frequencies $\omega_k$.

Figure 4:
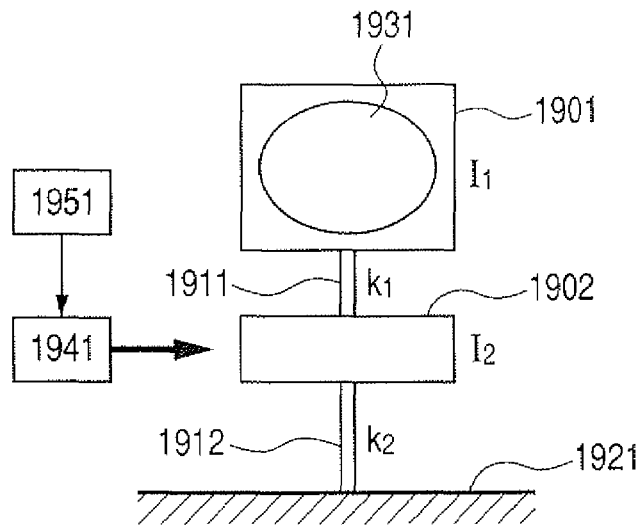
FIG. 4 is a diagram of a model used in studying a resonance optical deflector having two movable plates.

A resonance optical deflector having two movable plates as shown in FIG. 4 will be discussed as an example. In FIG. 4, reference signs 1901 and 1902 respectively designate movable plates, reference signs 1911 and 1912 respectively designate torsion springs, reference sign 1921 designates a support portion, reference sign 1931 designates a deflection surface provided on the movable plate 1901, reference sign 1941 designates drive means and reference sign 1951 designates drive control means.

Here, the following values are assumed.

$$I_1=1.3951\times10^{-11} [kgm^2], I_2=1.7143\times10^{-10} [kgm^2]$$

$$k_1=7.91914\times10^{-03} [N/m], k_2=3.0123\times10^{-02} [N/m]$$

In this case, the eigenvalues of $M^{-1}K$ are:

$$\lambda_1=1.5790\times10^8, \text{ and } \lambda_2=6.3166\times10^8.$$

Therefore, the corresponding natural frequencies are:

$$\omega_1=2\pi\times2000 \text{ [Hz], and } \omega_2=2\pi\times4000 \text{ [Hz]}.$$

Namely, $\omega_2=2\omega_1$. These oscillation modes will be hereinafter referred to as mode 1 (natural oscillation mode) and mode 2 (integer multiple oscillation mode) respectively.

In the optical deflector 6 according to this embodiment, the drive control means 1951 controls the drive means 1941 in such a way that the system constituted by the two movable plates 1901, 1902 and the two torsion springs 1911, 1912 oscillates simultaneously at the base frequency and its integer multiple frequency.

In this operation, it is possible to drive in various ways by changing the amplitude and phase of the oscillation of the movable plate at the base frequency and its integer multiple frequency.

In this embodiment, the drive control means 1951 controls the drive means 1941 so that the maximum amplitude $\phi_1$ of the oscillation of the movable plate 171 shown in FIG. 2 in mode 1 becomes $\phi_1=35.00339$ degrees, where angular frequency $\omega_1$ is: $\omega_1=2\pi\times2000$ [Hz], the maximum amplitude $\phi_2$ of oscillation of the movable plate 171 in mode 2 becomes $\phi_2=4.79697$ degrees, where angular frequency $\omega_2$ is: $\omega_2=2\pi\times4000$ [Hz], and the phases of these oscillation differ from each other by 180 degrees.

The oscillation angle $\theta_1$ of the movable plate 171 is given as follows.

$$\theta_1=\phi_1 \sin(\omega_1 t)-\phi_2 \sin(\omega_2 t) \quad (3)$$

The movable plate 171 is provided with the deflection surface 6a (not shown), and the light beam emitted from the semiconductor laser 1 is deflected in a scanning manner at the angle $2\theta_1$ twice the angle expressed in Formula (3) presented above.

Figure 5:
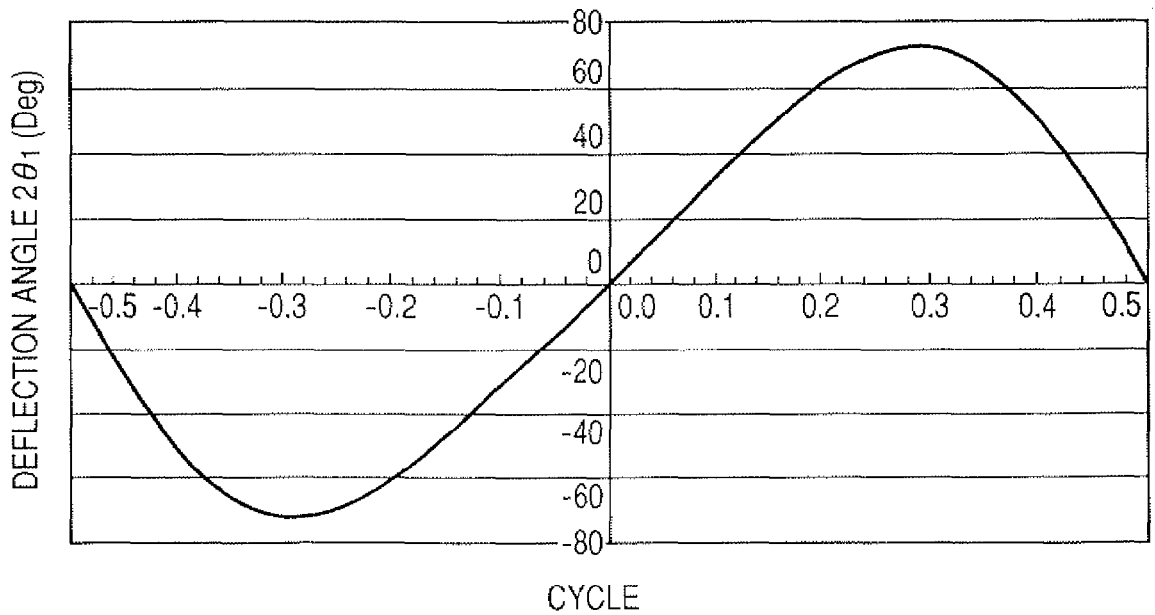
FIG. 5 is a graph showing the deflection angle $2\theta_1$ of the light beam reflected by the optical deflection in the first embodiment.

FIG. 5 shows the deflection angle $2\theta_1$ of the light beam reflected by the movable plate 171 of the optical deflector 6 in this embodiment. In FIG. 5, the horizontal axis represents the cycle of the back-and-forth oscillation (time) and the vertical axis represents the deflection angle (in unit of degree) of the optical deflector 6.

It will be understood that in this embodiment, a range in which the deflection angle is substantially proportional to time is realized by simultaneously exciting the aforementioned mode 1 and mode 2, in contrast to normal sinusoidal oscillation.

In the case where a normal resonance optical deflector that oscillates sinusoidally is used, since the deflection angle of the optical deflector 6 is not proportional to time, a special f×arc sin θ lens needs to be used as the imaging lens.

In this embodiment, since use is made of the resonance optical deflector having the above described characteristics, an ordinary fθ lens 7 may be used as the imaging lens.

Although use is made, in this embodiment, of the resonance optical deflector having the above descried excellent characteristics, the present invention is not limited by this particular feature, but a common resonance optical deflector that oscillates sinusoidally may be used. Alternatively, an optical deflector that simply swings back and forth without resonance may also be used.

The resonance optical deflector 6 used in this embodiment has only one deflection surface. Accordingly, it has the advantage that it is free from the above mentioned problem of changes in the position of the beam spot in the sub scanning direction on the photosensitive drum surface 8 caused by an optical face tangle error in the sub scanning direction in a plurality of reflection surfaces that the multi-face rotating mirrors suffer.

Therefore, in the imaging optical system in which the resonance optical deflector 6 is used, it is not necessary to use the optical face tangle error correction optical system in which the deflection surface Ca and the photosensitive drum surface 8 are arranged to be conjugate with each other in the sub scanning cross section. In other words, theoretically speaking, it is not necessary to use an anamorphic lens as the fθ lens 7 that constitutes the imaging optical system, but a lens having a rotationally symmetrical shape about the optical axis may be used.

Figure 6:
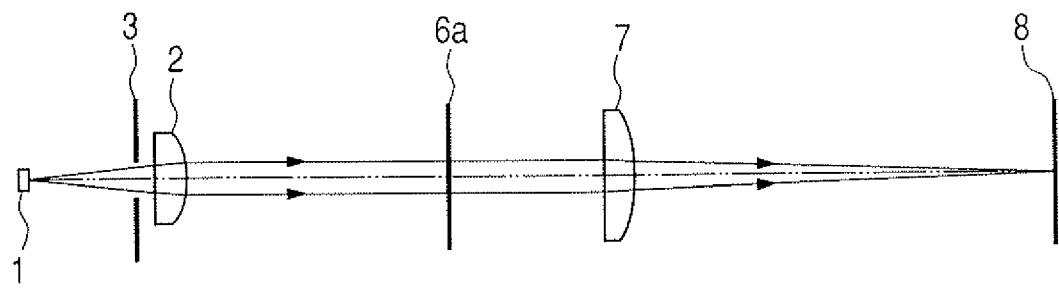
FIG. 6 is a cross sectional view in the sub scanning direction of the relevant portion of a system in which an optical face tangle error correction optical system is not used.

However, in that case, it is necessary that the light beam incident on the deflection surface 6a of the optical deflector 6 have a specific width with respect to the sub scanning direction as shown in FIG. 6.

FIG. 6 is a cross sectional view taken along the sub scanning direction (sub scanning cross section), of the relevant portion of a common imaging optical system in which the optical face tangle error optical system is not used. In FIG. 6, elements the same as those in FIG. 1 are designated by the same reference signs.

As will be understood from FIG. 6, in the system in which the optical face tangle error correction optical system is not used, the deflection surface 6a of the optical deflector 6 and the photosensitive drum surface 8 are not made conjugate with each other by the fθ lens 7. Accordingly, the light beam emergent from the collimator lens 2 is made incident on the deflection surface 6a in the state as it is emergent without being converged with respect to the sub scanning direction by a cylindrical lens 4.

Therefore, it is necessary that the light beam has a width, on the deflection surface 6a, corresponding to the size of the focused spot along the sub scanning direction on the photosensitive drum 8.

Figure 7:
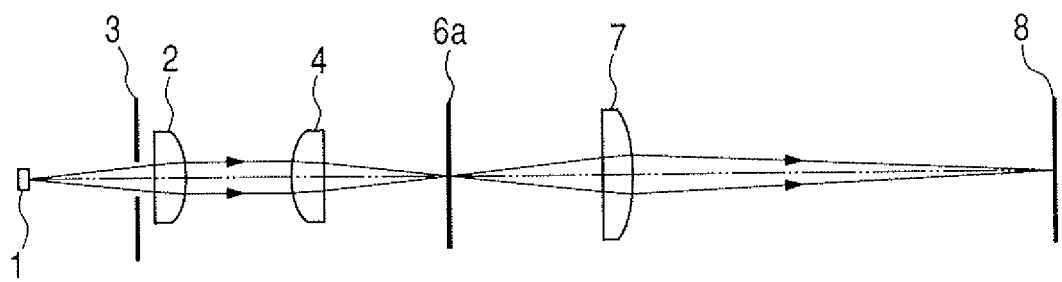
FIG. 7 is a cross sectional view in the sub scanning direction of the relevant portion of a system in which an optical face tangle error correction optical system is used.

FIG. 7 is a cross sectional view taken along the sub scanning direction (sub scanning cross section), of the relevant portion of a common imaging optical system in which an optical face tangle error correction optical system is used. In FIG. 7, elements the same as those in FIG. 1 are designated by the same reference signs.

As will be understood from FIG. 7, in the system in which an optical face tangle error correction system is used, the light beam emitted from the collimator lens 2 is converged by a cylindrical lens 4 with respect to the sub scanning direction before it is made incident on the deflection surface 6a. The deflection surface 6a of the optical deflector 6 and the photosensitive drum surface 8 are arranged to be conjugate with each other with respect to the fθ lens 7. Accordingly, the light beam is imaged on the deflection surface 6a in a linear shape that is longitudinal in the main scanning direction, and the width of the light beam in the sub scanning direction is generally 0.1 mm or less.

On the other hand, if the deflection surface 6a of the resonance optical deflector 6 is larger it is difficult to resonate it at high speed. For this reason, it is necessary that the size of the deflection surface 6a be made as small as possible when the resonance optical deflector 6 is used in a leaser beam printer or a digital copying machine etc.

In view of this, in this embodiment, in order to make it possible to increase the operation speed, the optical face tangle error correction optical system, which allows reduction of the size of the deflection surface 6a of the optical deflector 6, is used.

However, as described before, in the system in which the resonance optical deflector 6 is used, an optical face tangle error with respect to the sub scanning direction of a plurality of reflection surfaces, which multi-face rotating mirrors suffer, will not occur. Therefore, it is not necessary that the deflection surface 6a and the photosensitive drum surface 8 be arranged to be strictly conjugate with each other with respect to the fθ lens 7 as shown in FIG. 7.

In the following, details of the configuration in the sub scanning cross section of the imaging optical system of the optical scanning apparatus according to the first embodiment of the present invention will be described.

Figure 8:
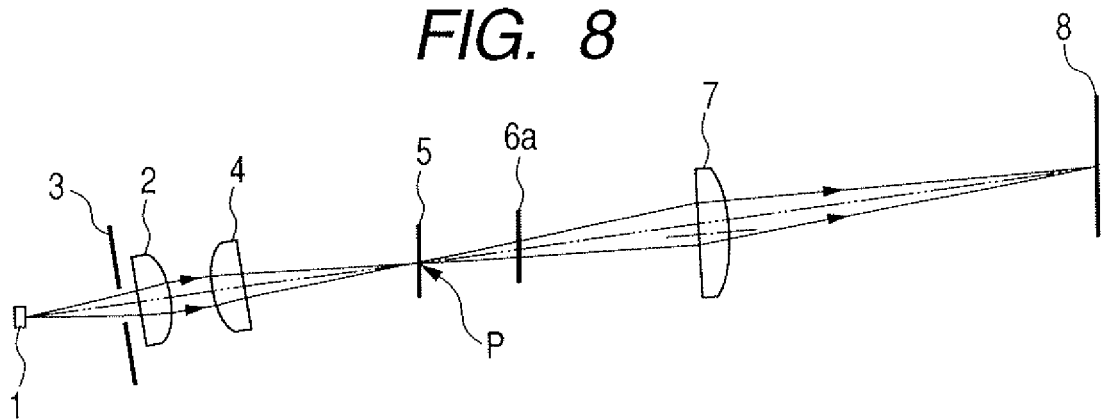
FIG. 8 is a cross sectional view in the sub scanning direction of the optical scanning apparatus according to the first embodiment of the present invention.

FIG. 8 is a cross sectional view taken along the sub scanning direction (sub scanning cross section) of the relevant portion of the optical scanning apparatus according to the first embodiment of the present invention that is applied to an image forming apparatus such as a laser beam printer or a digital copying machine. In FIG. 8, elements the same as those in FIG. 1 are designated by the same reference signs.

In this embodiment, the light beam is made incident on the deflection surface 6a of the optical deflector 6 frontally from right (i.e. from the fθ lens 7 side) in FIG. 1 (right-in-front incidence). When the light beam is made incident on the deflection surface 6a in this way, the size of the deflection surface 6a of the optical deflector 6 can be made minimum, and high speed oscillation can be easily attained.

When the above described beam incidence method is used, the light beam incident on the deflection surface 6a of the optical deflector 6 and the light beam reflected by the deflection surface 6a will interfere with each other. To avoid this, the light beam is made incident on the deflection surface 6a with a finite incidence angle with respect to the sub scanning direction (oblique incident optical system).

In this embodiment, the light beam is made incident on the deflection surface 6a of the optical deflector 6 obliquely from below (from below the plane of the drawing sheet of FIG. 1) with an angle of incidence of 3 degrees with respect to the sub scanning direction.

Accordingly, the light beam is reflected and deflected by the deflection surface 6a of the optical deflector 6 obliquely upwardly in the sub scanning direction (upwardly of the plane of the drawing sheet of FIG. 1) with an angle of 3 degrees with respect to the sub scanning direction.

The plastic fθ lens 7 that constitutes the imaging optical system is positioned above the reflection surface 6a with a specific distance with respect to the sub scanning direction so that the deflected light beam having been reflected and deflected obliquely upwardly is incident on it. Thus, the fθ lens 7 images (or converges) the deflected light beam incident thereon onto the photosensitive drum surface 8 as a spot.

A normal optical face tangle error correction optical system is adapted to focus the light beam converged by a cylindrical lens 4 with respect to the sub scanning direction on the deflection surface 6a. However, in this embodiment, the light beam is focused at a position (point P) on the light source means 1 side of the light deflection surface 6a, as shown in FIG. 8.

More specifically, the system is arranged in such a way that the light beam is focused (or converged) on a reflection surface of a mirror 5 for bending the optical path in the main scanning direction. The light beam traveling the optical path bent in the main scanning direction by the mirror 5 is incident on the deflection surface 6a as a beam that divergent in the sub scanning direction.

The beam width in the sub scanning direction in this case is larger as compared to that in the system like an ordinary optical face tangle error correction system in which the beam is converged on the deflection surface 6a. However, if the distance from the beam convergence position (point P) in the sub scanning cross section to the deflection surface 6a is not too large, it is possible to make the beam width in the sub scanning direction far shorter than that in the case where an optical face tangle error correction system is not used. Therefore, it is possible to oscillate the deflection surface 6a at high speed.

The optical face tangle error correction system like the system in this embodiment in which the deflection surface 6a of the optical deflector 6 and the photosensitive drum surface 8 are not made strictly conjugate with each other with respect to the fθ lens 7 but the conjugate relationship is intentionally broken will be referred to as an optical face tangle error correction relaxation system.

In this embodiment, the beam width in the sub scanning direction on the deflection surface 6a is made small by the use of the optical face tangle error correction relaxation system, whereby the size of the deflection surface 6a can be made small. Thus, it is possible to oscillate it at high speed.

To drive the deflection surface 6a of the optical deflector by resonance at high speed, it is desirable that the width of the deflection surface 6a in the sub scanning direction is smaller than or equal to 1 mm.

Figure 9:
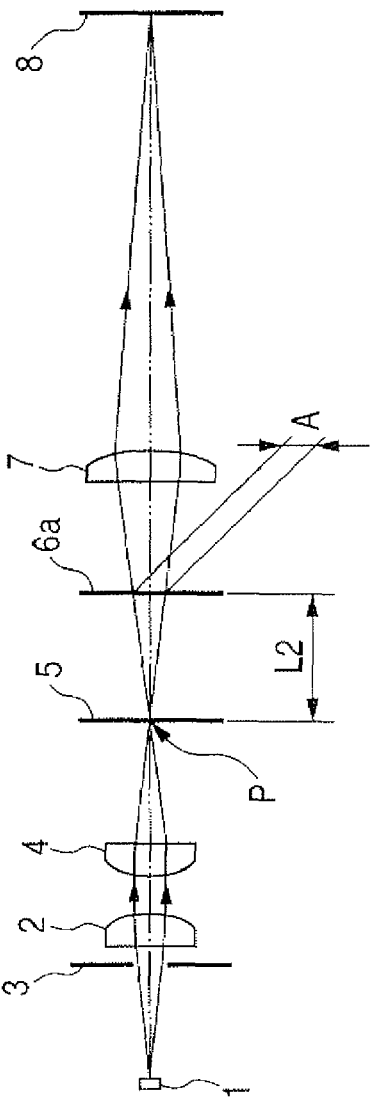
FIG. 9 is a diagram for illustrating the beam width in the sub scanning direction on the deflection surface.

As shown in FIG. 9, the distance from the convergence position P of the light beam converged by the cylindrical lens 4 with respect to the sub scanning direction in the sub scanning cross section to the deflection surface 6a will be represented by L2, the imaging magnification of the fθ lens 7 in the sub scanning cross section will be represent by $\beta$, and the spot diameter of the focused beam spot on the photosensitive drum surface 8 in the sub scanning direction will be represented by D.

Here, the spot diameter D is defined as the diameter of the focused beam spot having an intensity of $e^{1/2}$, where the peak intensity of the focused beam spot is normalized to 1.

The spot diameter D of the focused beam spot on the photosensitive drum surface 8 in the sub scanning direction is expressed as follows:

$$D = 1.64 F'\lambda$$

where, F' represents the F-number of the fθ lens 7 in the sub scanning direction on the photosensitive drum surface 8 side, and $\lambda$ represents the wavelength of the light beam emitted from the light source means.

The F number F of the fθ lens 7 in the sub scanning direction on the deflection surface side 6a is expressed as follows.

$$F = \frac{F'}{\beta} = \frac{D}{1.64\lambda\beta}$$

On the other hand, letting A be the beam width in the sub scanning direction on the deflection surface 6a, the F number is expressed as follows.

$$F = \frac{L2}{A}$$

From this follows the following relationship.

$$\frac{L2}{A} = \frac{D}{1.64\lambda\beta}$$

Therefore, the beam width A in the sub scanning direction on the deflection surface 6a is expressed as follows.

$$A = \frac{1.64\lambda\beta \times L2}{D} \quad (4)$$

To make the width of the deflection surface 6a in the sub scanning direction smaller than or equal to 1 mm, it is necessary to make the beam width A in the sub scanning direction on the deflection surface 6a smaller than or equal to 1 mm.

Namely, the right-hand side of formula (4) should be smaller than 1. From this, the following condition can be derived.

$$L2(\text{mm}) \leq 0.61\frac{D}{\lambda\beta} \quad (5)$$

This means that by arranging the distance L2 from the convergence position P of the light beam converged with respect to the sub scanning direction in the sub scanning cross section to the deflection surface 6a in the range that satisfies the above formula (5), it is possible to make the width of the deflection surface 6a in the sub scanning direction smaller than or equal to 1 mm. Thus, it is possible to drive the optical deflector 6 at high speed by resonance drive.

With D=0.077, λ=0.00078, β=1.814, and L2=14.5 in this embodiment, the right-hand side of formula (5) is calculated as follows.

$$0.61\frac{D}{\lambda\beta} = 33.196$$

This satisfies formula (5).

In this embodiment, the beam convergence position (point P) in the sub scanning cross section is arranged on the light source 1 side of the deflection surface 6a. More specifically, it is arranged on the mirror 5. In the following, why the position of the beam convergence position (point P) is arranged in the above described manner will be described.

The imaging magnification β of the fθ lens 7 as the imaging optical system in the sub scanning cross section is determined by the distance from the focus position (point P) in the sub scanning cross section to the fθ lens 7 and the distance from the fθ lens 7 to the photosensitive drum surface 8.

Therefore, if the position of the fθ lens 7 is the same, it is obvious that the imaging magnification β of the fθ lens 7 in the sub scanning cross section can be made smaller in the optical face tangle error correction relaxation optical system in this embodiment than that in an ordinary optical face tangle error correction optical system.

If the imaging magnification β of the fθ lens 7 in the sub scanning cross section can be made small, it is possible to make the sensitivity of positioning of the fθ lens 7 low. Thus, manufacturing of a highly precise optical scanning apparatus can be made easier.

When a plastic material with which the fθ lens 7 can be manufactured easily is used, a focus error in the sub scanning direction can be reduced by a change in the refractive index of the lens material caused by an increase in the temperature of the apparatus. Therefore, it is possible to provide an optical scanning apparatus having excellent environmental characteristic.

Even in the case where the position of the fθ lens 7 is made closer to the deflection surface 6a in order to achieve size reduction, the imaging magnification β in the sub scanning cross section does not become so large. Therefore, it is possible to provide an optical scanning apparatus in which the size of the fθ lens 7 can be made smaller as compared to ordinary optical face tangle error correction optical systems.

As described the above, the optical scanning apparatus according to this embodiment has various advantageous effects.

To realize the above described advantageous effects, it is sufficient to arrange the beam convergence position (point P) in the sub scanning cross section on the light source means 1 side of the deflection surface 6a. In this embodiment, the beam convergence position (point P) in the sub scanning cross section is arranged on the mirror 5.

In the following the reason why such an arrangement is used will be described.

As shown in FIG. 1, the light beam is made incident on the deflection surface 6a from the fθ lens 7 side thereof. If the light source means 1, the collimator lens 2 and the cylindrical lens 4 are also arranged on the fθ lens 7 side of the deflection surface 6a, the light beam incident on the deflection surface 6a will interfere with the fθ lens 7. In addition, the light beam emergent from the fθ lens 7 will interfere with the light source means 1, the collimator lens 2 and the cylindrical lens 4 etc.

In view of this, it is necessary to bend the optical path in the main scanning direction using the mirror 5 to arrange the light source means 1, the collimator lens 2, and the cylindrical lens 4 at positions where interference with the beam is avoided.

It is sufficient for the mirror 5 that changes the direction in which the light beam travels to have only a function of bending the optical path in the main scanning direction.

However, if the mirror 5 that changes the direction in which the light beam travels is simply mounted on the housing of the optical scanning apparatus, an error in the mount angle of the mirror 5 can occur.

The mirror 5 that changes the direction in which the light beam travels may be long to some extent in the main scanning direction. However, if the mirror 5 is long in the sub scanning direction, it can interfere with the light beam reflected by the deflection surface 6a and the size of the optical scanning apparatus in the sub scanning direction can become large. For this reason, the mirror 5 is not allowed to have a large length in the sub scanning direction. Accordingly, an error in the mount angle of the mirror 5 is likely to occur especially in the sub scanning direction.

The system in which an ordinary optical face tangle error correction optical system is used has the disadvantage that an angle error (if any) of the mirror 5 in the sub scanning direction leads to a displacement of the imaging position in the sub scanning direction on the photosensitive drum surface 8. For this reason, in conventional optical scanning apparatuses, correction of an angle error of the mirror 5 in the sub scanning direction is performed for each apparatus.

In contrast, the system like this embodiment in which the beam convergence position (point P) in the sub scanning cross section is arranged to be on the mirror 5 has the following advantage.

In such systems, since the reflection surface of the mirror 5 and the photosensitive drum surface 8 are arranged to be conjugate with each other in the sub scanning cross section with respect to the fθ lens 7, an angle error (if any) of the mirror 5 in the sub scanning direction will not lead to any displacement of the imaging position on the photosensitive drum surface 8.

Therefore, it is not necessary to correct an angle error of the mirror 5 in the sub scanning direction in each apparatus in contrast to conventional apparatuses. Thus, the manufacturing cost can be reduced greatly.

Tables 1-1 and 1-2 presented below show data on the optical scanning apparatus (or optical scanning optical system) according to this embodiment.

The aspherical shape of the fθ lens 7 in the main scanning cross section is expressed by the following equation, where the origin of the coordinate system is located at the intersection point of each lens surface and the optical axis, the X axis is on the optical axis, the Y axis is on the line perpendicular to the optical axis in the main scanning cross section, Z axis is on the line perpendicular to the optical axis in the sub scanning cross section, R represents the radius of curvature and k and B4 through B16 are aspherical coefficients.

$$x = \frac{y^2/R}{1 + (1 - (1+k)(y/R)^2)^{1/2}} + \sum_{i=4}^{16} Biy^i$$

The shape of the fθ lens 7 in the sub scanning cross section is expressed as follows, where y represents the Y coordinate value of a point on the lens surface in the main scanning direction, r' represents the radius of curvature at that point, r represents the radius of curvature on the optical axis, and D2 through D10 are coefficients.

$$r' = r\left(1 + \sum_{j=2}^{10} Djy^j\right)$$

TABLE 1-1

| | | | | | | |
|---|---|---|---|---|---|---|
| Reference wavelength used | λ (nm) | | | 780 | | |
| Number of light emission points | n | | | 1 | | |
| Light emission position | x0 (mm) | 14.49117 | y0 (mm) | −69.76748 | z0 (mm) | −2.94238 |
| refractive index of laser cover glass | n0 | | | 1.51072 | | |
| Thickness of laser cover glass | dcg (mm) | | | 0.25 | | |
| position of stop | x1 (mm) | 14.49117 | Y1 (mm) | −46.61160 | z1 (mm) | −2.13376 |
| aperture shape | ellipse | | 2.74 mm (main scanning) × 1.1 mm (sub scanning) | | | |
| distance between light emission point and 1st surface of collimator lens | d0 (mm) | | | 23.67000 | | |
| Position of 1st surface of collimator lens | x2 (mm) | 14.49117 | y2 (mm) | −46.11190 | z2 (mm) | −2.11631 |
| Position of 2nd surface of collimator lens | x3 (mm) | 14.49117 | y3 (mm) | −44.11312 | z3 (mm) | −2.04651 |
| Thickness of collimator lens | d1 (mm) | | | 2.0000 | | |
| refractive index of collimator lens | n1 | | | 1.76203 | | |
| radius of curvature of 1st surface of collimator lens | R1 (mm) | | | 182.21200 | | |
| radius of curvature of 2nd surface of collimator lens | R2 (mm) | | | −18.91229 | | |
| Distance between 2nd surface of collimator lens and 1st surface of cylindrical lens | d2 (mm) | | | 4.76000 | | |
| Position of 1st surface of cylindrical lens | x4 (mm) | 14.49117 | y4 (mm) | −39.35602 | z4 (mm) | −1.88039 |
| Position of 2nd surface of cylindrical lens | x5 (mm) | 14.49117 | y5 (mm) | −36.35735 | z5 (mm) | −1.77569 |
| thickness of cylindrical lens | d3 (mm) | | | 3.0000 | | |
| refractive index of cylindrical lens | n2 | | | 1.51072 | | |
| radius of curvature of 1st surface of cylindrical lens in sub scanning direction | Rs3 (mm) | | | 22.88000 | | |
| radius of curvature of 1st surface of | Rm3 (mm) | | | ∞ | | |

TABLE 1-1-continued

| | | | | | | |
|---|---|---|---|---|---|---|
| cylindrical lens in main scanning direction | | | | | | |
| radius of curvature of 2nd surface of cylindrical lens | R4 (mm) | | | ∞ | | |
| distance between 2nd surface of cylindrical lens and optical path turn-back mirror | d4 (mm) | | | 36.38000 | | |
| position of optical path turn-back mirror | x6 (mm) | 14.49117 | y6 (mm) | 0.00000 | z6 (mm) | −0.50604 |
| radius of curvature of optical path turn-back mirror | R5 (mm) | | | ∞ | | |
| distance between optical path turn-back mirror and deflection surface | d5 (mm) | | | 14.50000 | | |
| position of deflection surface | x6 (mm) | 0.00000 | y6 (mm) | 0.00000 | z6 (mm) | 0.00000 |
| distance between deflection surface and 1st surface of fθ lens | d6 (mm) | | | 27.40000 | | |
| position of 1st surface of fθ lens | x6 (mm) | 27.38331 | y6 (mm) | 0.00000 | z6 (mm) | 0.49528 |
| position of 2nd surface of fθ lens | x7 (mm) | 35.78300 | y7 (mm) | 0.00000 | z7 (mm) | 0.56732 |
| thickness of fθ lens | d7 (mm) | | | 8.40000 | | |
| reflective index of fθ lens | n3 | | | 1.52420 | | |
| distance between fθ lens and surface to be scanned | d10 (mm) | | | 91.92316 | | |
| position of surface to be scanned | x10 (mm) | 127.68541 | y10 (mm) | 0.00000 | z10 (mm) | 2.52025 |
| focal length of fθ lens in main scanning direction | f (mm) | | | 121.57274 | | |
| incidence angle of incident optical system (main scanning cross section) | γ (deg) | | | 90.00000 | | |
| oblique incidence angle of incident optical system (sub scanning cross section) | β (deg) | | | 3.00000 | | |
| elevation angle of fθ lens (sub scanning direction) | δ (deg) | | | 0.49132 | | |
| effective scan angle of optical deflector | ξ (deg) | | | 25.21391 | | |
| resonance frequency of optical deflector | f0 (KHz) | | | 2.00000 | | |
| dimension of deflection surface of optical deflector | rectangle | | | 3 mm (main scanning) × 1 mm (sub scanning) (thickness 0.2 mm) | | |

TABLE 1-2

| shape of fθ lens | | | |
|---|---|---|---|
| 1st surface | | 2nd surface | |
| R | 33.88765 | R | 41.60870 |
| k | −4.53181E−01 | k | −5.04012E−01 |
| B4 | −2.28908E−05 | B4 | −1.87482E−05 |
| B6 | 1.94865E−08 | B6 | 1.36689E−08 |
| B8 | −1.21761E−11 | B8 | −7.16602E−12 |
| B10 | 4.16161E−15 | B10 | 1.96680E−15 |
| B12 | −6.52334E−19 | B12 | −1.00799E−19 |
| B14 | 2.04282E−23 | B14 | −2.52777E−23 |
| B16 | −2.96006E−26 | B16 | −1.84803E−26 |
| r | −35.44040 | r | −12.28200 |

TABLE 1-2-continued

| shape of fθ lens | | | |
|---|---|---|---|
| 1st surface | | 2nd surface | |
| D2 | 1.51187E−03 | D2 | 1.37549E−03 |
| D4 | 1.13289E−05 | D4 | −9.34443E−07 |
| D6 | −5.21000E−11 | D6 | 3.43902E−10 |
| D8 | 2.71826E−11 | D8 | −6.04335E−14 |
| D10 | 0.00000E+00 | D10 | 0.00000E+00 |

Figure 10:
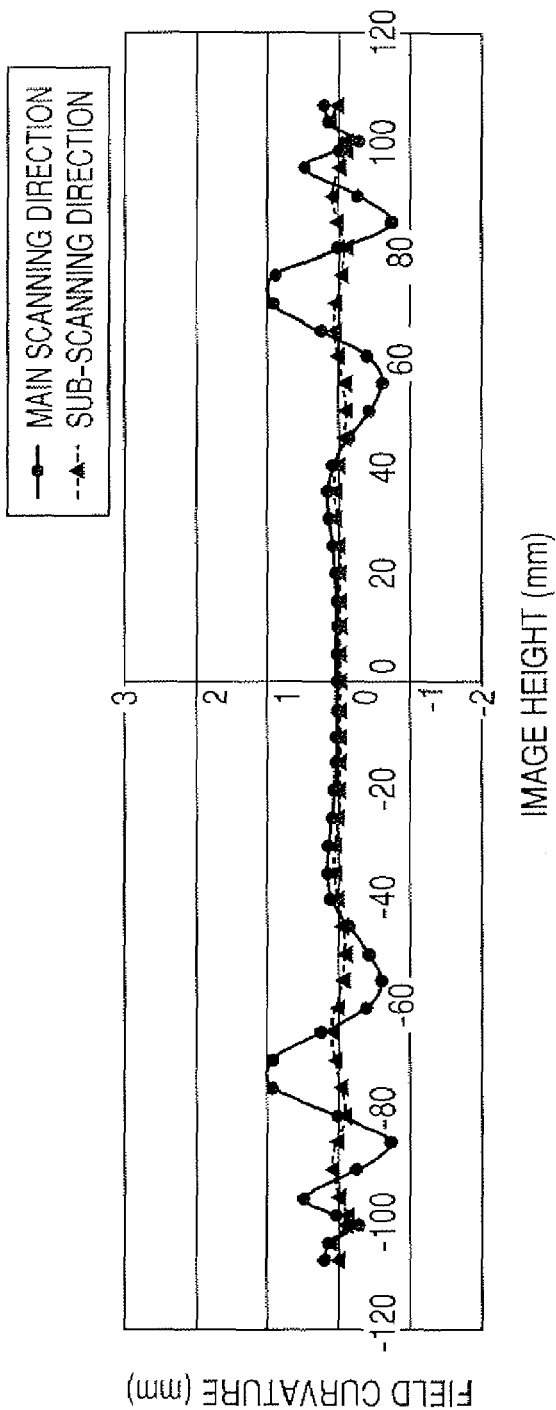
FIG. 10 is a graph showing curvature of field in the main scanning direction and the sub scanning direction at room temperature in the first embodiment.

FIG. 10 shows the curvature of field in the main scanning direction and the sub scanning direction in this embodiment at room temperature. In this embodiment, the fθ lens 7 is manufactured by injection molding using a plastic material to make the manufacturing process simple.

In this case, defocus or displacement of the focus position can occur in the main scanning direction and the sub scanning direction with a change in the refractive index of the lens material due to a rise in the temperature of the apparatus (an environmental change).

Figure 11:
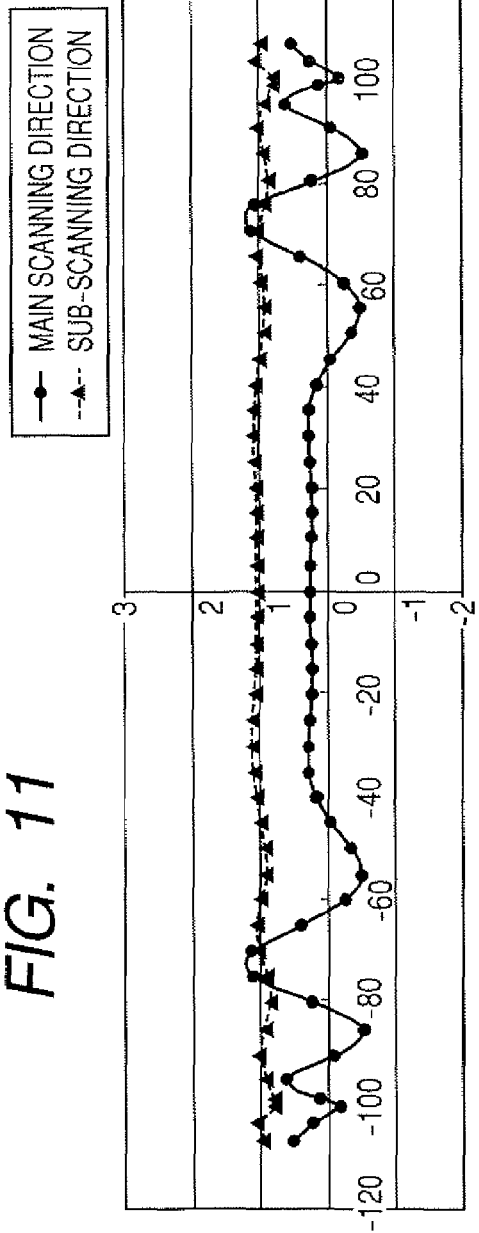
FIG. 11 is a graph showing curvature of field in the main scanning direction and the sub scanning direction when the temperature of the apparatus has risen by 25° C. in the first embodiment.
Figure 12:
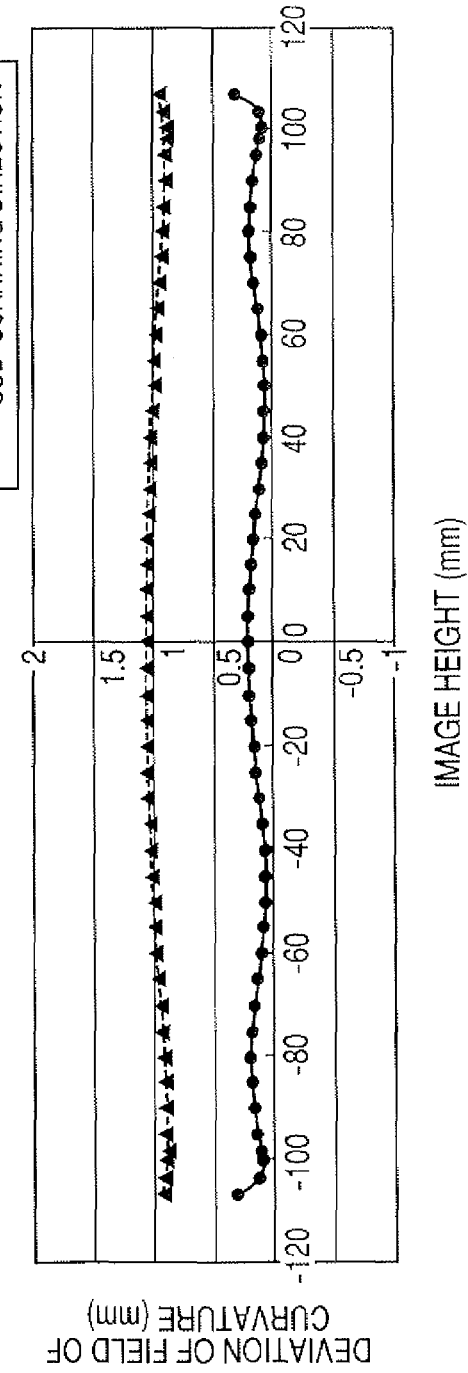
FIG. 12 is a graph showing changes in the image plane (defocus) in the main scanning direction and the sub scanning direction when the temperature of the apparatus rises by 25° C. in the first embodiment.

FIG. 11 shows the curvature of field in the main scanning direction and the sub scanning direction in the case where the temperature of the apparatus has risen by 25° C. FIG. 12 shows changes in the image plane (defocus amount) in the main scanning direction and the sub scanning direction with a rise in the temperature of the apparatus by 25° C.

It will be seen from these graphs that the image plane shifts by approximately +0.8 mm to +1 mm in the sub scanning direction as compared to that at the room temperature. The imaging magnification β of the fθ lens 7 in the sub scanning cross section in this embodiment is 1.814.

Figure 13:
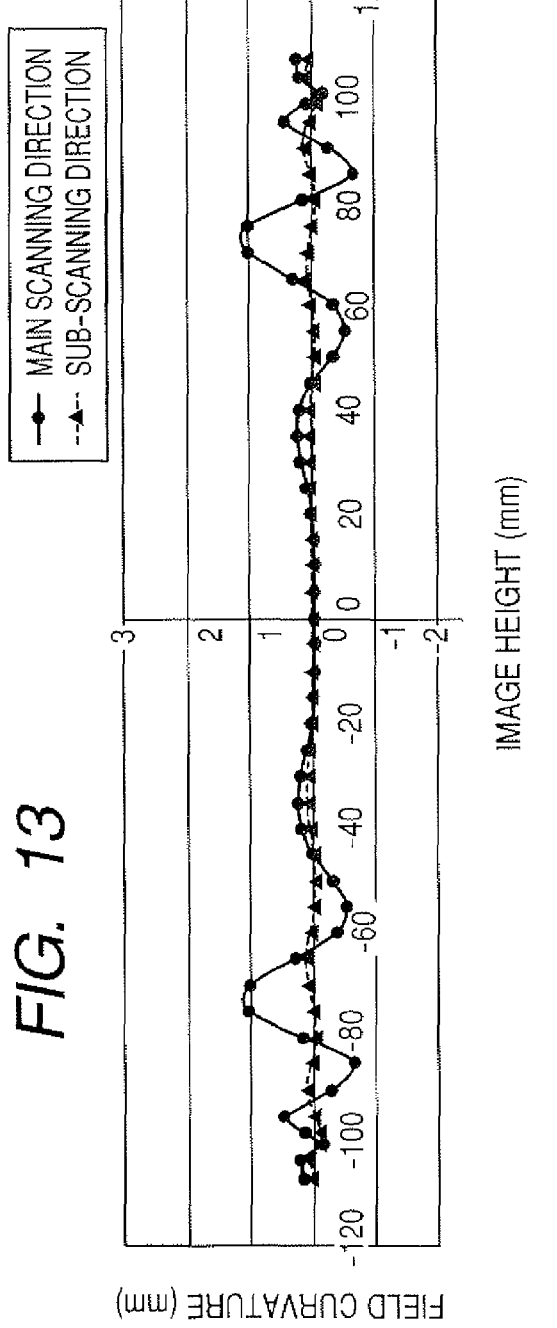
FIG. 13 is a graph showing curvature of field in the main scanning direction and the sub scanning direction at room temperature in a comparative example.
Figure 14:
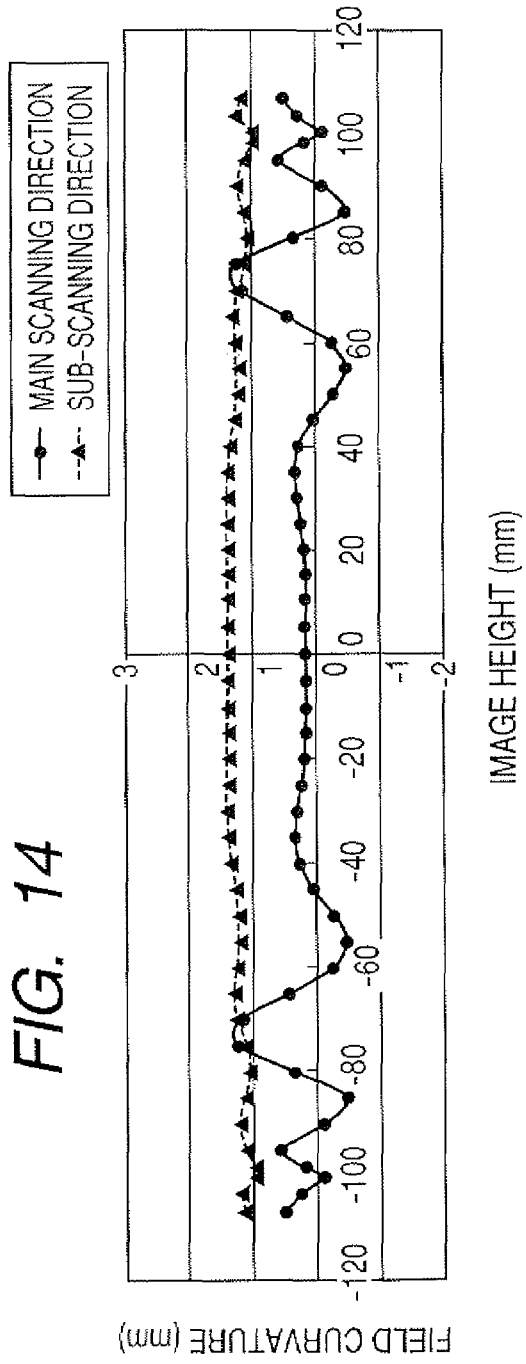
FIG. 14 is a graph showing curvature of field in the main scanning direction and the sub scanning direction when the temperature of the apparatus has risen by 25° C. in the comparative example.
Figure 15:
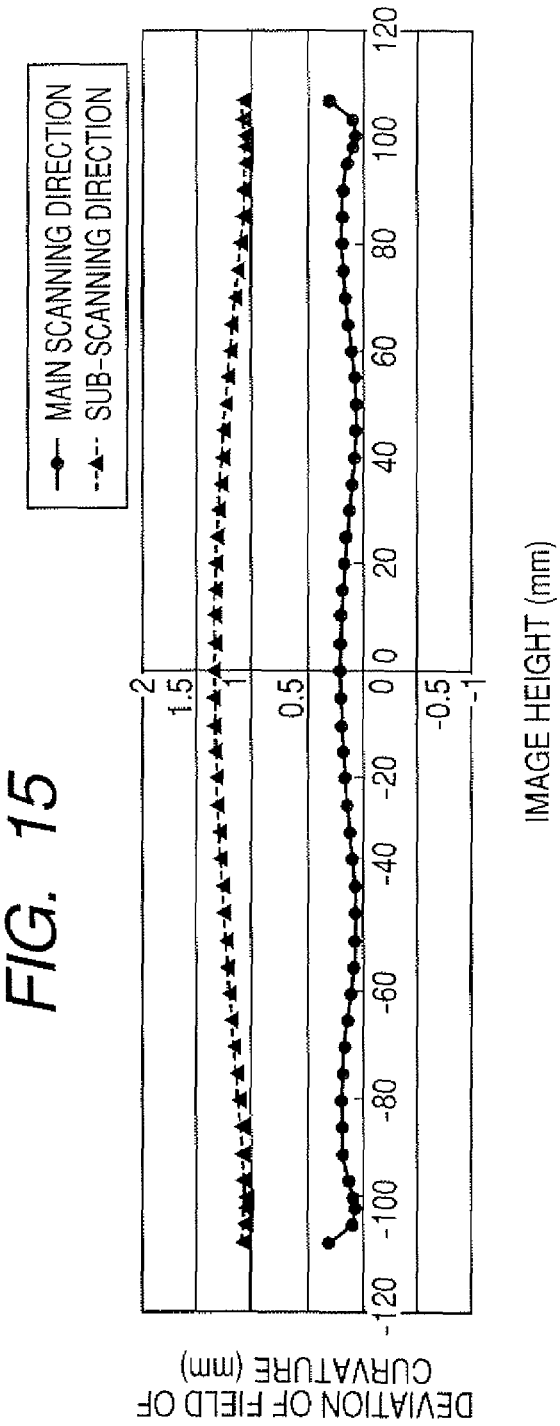
FIG. 15 is a graph showing changes in the image plane (defocus) in the main scanning direction and the sub scanning direction when the temperature of the apparatus rises by 25° C. in the comparative example.

FIG. 13 shows the curvature of field at room temperature in a comparative example in which the beam convergence position (point P) in the sub scanning cross section is arranged on the deflection surface 6a. FIG. 14 shows the curvature of field in the main scanning direction and the sub scanning direction in the case where the temperature of the apparatus has risen by 25° C. FIG. 15 shows changes in the image plane (defocus amount) in the main scanning direction and the sub scanning direction with a rise in the temperature of the apparatus by 25° C.

It will be seen from these graphs that the image plane shifts by approximately +1 mm to +1.3 mm in the sub scanning direction as compared to that at the room temperature. The imaging magnification β of the fθ lens 7 in the sub scanning cross section in this comparative example is 2.484.

It will be appreciated that the changes in the image plane in the sub scanning direction with a rise in the temperature in the embodiment is smaller than the changes in the image plane in the sub scanning direction with a rise in the temperature in the comparative example.

This smallness in changes in the image plane is thanks to reduction of the imaging magnification β of the fθ lens 7 in the sub scanning cross section realized by the use of the optical face tangle error correction relaxation optical system in which the beam convergence position (point P) in the sub scanning cross section is arranged to be on the light source 1 side of the deflection surface 6a.

As per the above, in the optical scanning apparatus according to this embodiment, defocus in the sub scanning direction with a change in the refractive index of the lens material caused by a rise in the temperature of the apparatus can be made smaller. Thus, it is possible to provide an optical scanning apparatus that is less affected by environmental changes.

Tables 2-1 and 2-2 presented below show data on the optical scanning apparatus (or optical scanning optical system) of the comparative example.

The configuration of the optical system in the comparative example is the same as that shown in FIGS. 1 and 8 except that the position of the beam convergence point P shown in FIG. 8 has been changed from a point on the mirror 5 to a point on the deflection surface 6a.

What is meant by coefficients R, k, B4 through B16, r and D2 through D10 used in expressing the aspherical shape of the fθ lens 7 in the main scanning cross section is the same as that in the first embodiment.

TABLE 2-1

| | | | | | |
|---|---|---|---|---|---|
| reference wavelength used | λ (nm) | | 780 | | |
| number of light emission point | N | | 1 | | |
| light emission position | x0 (mm) | 14.49117 y0 (mm) | −69.76748 z0 (mm) | | −2.94238 |
| refractive index of laser cover glass | n0 | | 1.51072 | | |
| thickness of laser cover glass | dcg (mm) | | 0.25 | | |
| position of stop | x1 (mm) | 14.49117 y1 (mm) | −46.61160 z1 (mm) | | −2.13376 |
| aperture shape | ellipse | 2.74 mm (main scanning) × 2.02 mm (sub scanning) | | | |
| distance between light emission point and 1st surface of collimator lens | d0 (mm) | | 23.67000 | | |
| position of 1st surface of collimator lens | x2 (mm) | 14.49117 y2 (mm) | −46.11190 z2 (mm) | | −2.11631 |
| position of 2nd surface of collimator lens | x3 (mm) | 14.49117 y3 (mm) | −44.11312 z3 (mm) | | −2.04651 |
| thickness of collimator lens | d1 (mm) | | 2.0000 | | |
| refractive index of collimator lens | n1 | | 1.76203 | | |
| radius of curvature of 1st surface of collimator lens | R1 (mm) | | 182.21200 | | |
| radius of curvature of 2nd surface of collimator lens | R2 (mm) | | −18.91363 | | |
| distance between 2nd surface of collimator lens and 1st surface of cylindrical lens | d2 (mm) | | 4.76000 | | |
| position of 1st surface of cylindrical | x4 (mm) | 14.49117 y4 (mm) | −39.35602 z4 (mm) | | −1.88039 |

TABLE 2-1-continued

| lens | | | | | |
|---|---|---|---|---|---|
| position of 2nd surface of cylindrical lens | x5 (mm) | 14.49117 | y5 (mm) | −36.35785 z5 (mm) | −1.77569 |
| thickness of cylindrical lens | d3 (mm) | | | 3.0000 | |
| refractive index of cylindrical lens | n2 | | | 1.51072 | |
| radius of curvature of 1st surface of cylindrical lens in sub scanning direction | Rs3 (mm) | | | 33.71700 | |
| radius of curvature of 1st surface of cylindrical lens in main scanning direction | Rm3 (mm) | | | ∞ | |
| radius of curvature of 2nd surface of cylindrical lens | R4 (mm) | | | ∞ | |
| distance between 2nd surface of cylindrical lens and optical path turn-back mirror | d4 (mm) | | | 36.38000 | |
| position of optical path turn-back mirror | x6 (mm) | 14.49117 | y6 (mm) | 0.00000 z6 (mm) | −0.50604 |
| radius of curvature of optical path turn-back mirror | R5 (mm) | | | ∞ | |
| distance between optical path turn-back mirror and deflection surface | d5 (mm) | | | 14.50000 | |
| position of deflection surface | x6 (mm) | 0.00000 | y6 (mm) | 0.00000 z6 (mm) | 0.00000 |
| distance between deflection surface and 1st surface of fθ lens | d6 (mm) | | | 27.40000 | |
| position of 1st surface of fθ lens | x6 (mm) | 27.38331 | y6 (mm) | 0.00000 z6(mm) | 0.49528 |
| position of 2nd surface of fθ lens | x7 (mm) | 35.78300 | y7 (mm) | 0.00000 z7 (mm) | 0.56732 |
| thickness of fθ lens | d7 (mm) | | | 8.40000 | |
| reflective index of fθ lens | n3 | | | 1.52420 | |
| distance between fθ lens and surface to be scanned | d10 (mm) | | | 91.92316 | |
| position of surface to be scanned | x10 (mm) | 127.68541 | y10 (mm) | 0.00000 z10 (mm) | 2.52025 |
| focal length of fθ lens in main scanning direction | f (mm) | | | 121.57274 | |
| incidence angle of incident optical system (main scanning cross section) | γ (deg) | | | 90.00000 | |
| oblique incidence angle of incident optical system (sub scanning cross section) | β (deg) | | | 3.00000 | |
| elevation angle of fθ lens (sub scanning direction) | δ (deg) | | | 0.49132 | |
| effective scan angle of optical deflector | ξ (deg) | | | 25.21391 | |
| resonance frequency of optical deflector | f0 (KHz) | | | 2.00000 | |
| dimension of deflection surface of optical deflector | rectangle | | 3 mm (main scanning) × 1 mm (sub scanning) (thickness 0.2 mm) | | |

TABLE 2-2

| | shape of fθ lens | | |
|---|---|---|---|
| | 1st surface | | 2nd surface |
| R | 33.63021 | R | 41.19390 |
| k | −4.64477E−01 | k | −5.31362E−01 |
| B4 | −2.30971E−05 | B4 | −1.89008E−05 |
| B6 | 1.95968E−08 | B6 | 1.37603E−08 |
| B8 | −1.21697E−11 | B8 | −7.17755E−12 |
| B10 | 4.15469E−15 | B10 | 1.97164E−15 |
| B12 | −6.52552E−19 | B12 | −1.01139E−19 |
| B14 | 1.97239E−23 | B14 | −2.31934E−23 |
| B16 | −2.87071E−26 | B16 | −1.93031E−26 |
| r | −17.94580 | r | −8.88418 |
| D2 | 2.23538E−03 | D2 | 1.60823E−03 |
| D4 | 1.01542E−05 | D4 | −9.04079E−07 |
| D6 | −4.38418E−09 | D6 | 3.12857E−10 |
| D8 | 1.87220E−11 | D8 | −6.11669E−14 |
| D10 | 0.00000E+00 | D10 | 0.00000E+00 |

In the following, a description will be made of assembly errors of optical parts.

When optical parts are assembled on the housing of the optical scanning apparatus, some kind of assembly errors occur. Here, a case in which the cylindrical lens 4 is mounted with a position error of 0.1 mm toward the deflection surface 6a along the optical axis will be considered as an example. In this case, the image plane does not change in the main scanning direction, but changes only in the sub scanning direction, since the cylindrical lens 4 does not have refractive power in the main scanning direction.

Figure 16:
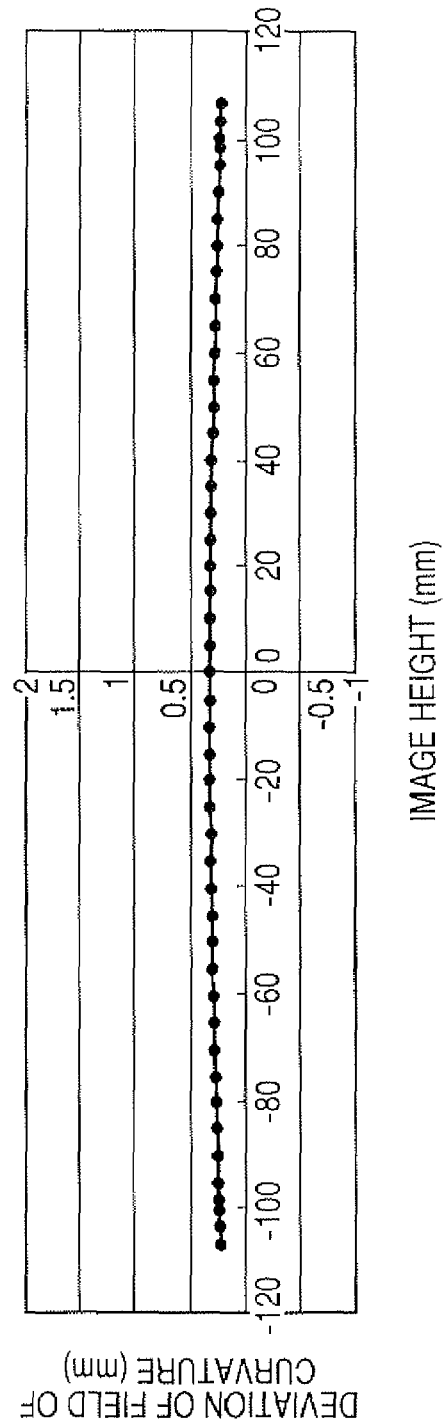
FIG. 16 is a graph showing changes in the image plane in the sub scanning direction in the case where a cylindrical lens is mounted with a position error of 0.1 mm toward the deflection surface along the optical axis in the first embodiment.
Figure 17:
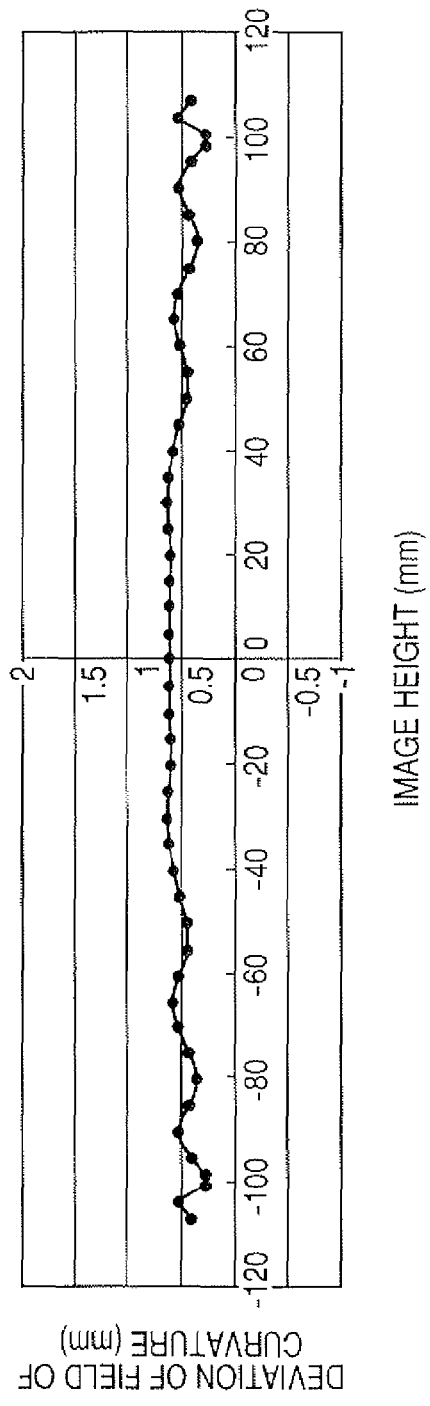
FIG. 17 is a graph showing changes in the image plane in the sub scanning direction in the case where a cylindrical lens is mounted with a position error of 0.1 mm toward the deflection surface along the optical axis in the comparative example.

FIG. 16 shows changes in the image plane in the sub scanning direction in the case where the cylindrical lens 4 is mounted with a position error of 0.1 mm toward the deflection surface 6a along the optical axis in the first embodiment. FIG. 17 shows changes in the image plane in the sub scanning direction in the case where the cylindrical lens 4 is mounted with a position error of 0.1 mm toward the deflection surface 6a along the optical axis in the above mentioned comparative example.

In the first embodiment, changes in the image plane in the sub scanning direction are kept smaller than or equal to 0.3 mm, while in the comparative example, changes in the image plane in the sub scanning direction reach approximately 0.6 mm. AS will be clearly understood from this, changes in the image plane in the sub scanning direction in the first embodiment is smaller than those in the comparative example.

This is because the system used in the first embodiment is an optical face tangle error correction relaxation system in which the beam convergence position (point P) in the sub scanning cross section is arranged to be on the light source 1 side of the deflection surface 6a, and the sensitivity of positioning of the optical system is reduced with a reduction in the imaging magnification β of the fθ lens 7 in the sub scanning cross section.

As per the above, in the optical scanning apparatus according to this embodiment, the sensitivity of positioning of the optical system can be reduced. Thus, it is possible to manufacture a highly precise optical scanning apparatus more easily. This is an additional advantage.

Figure 18:
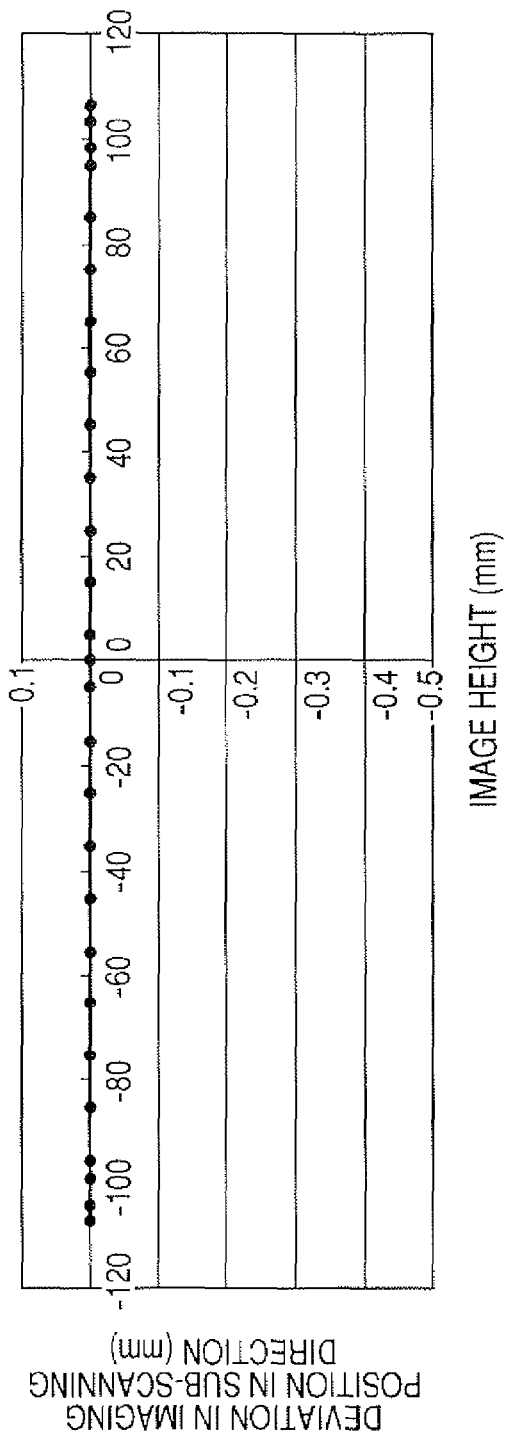
FIG. 18 is a graph showing deviations in the imaging position in the sub scanning direction that occur with an error in the angle of a mirror in the first embodiment.
Figure 19:
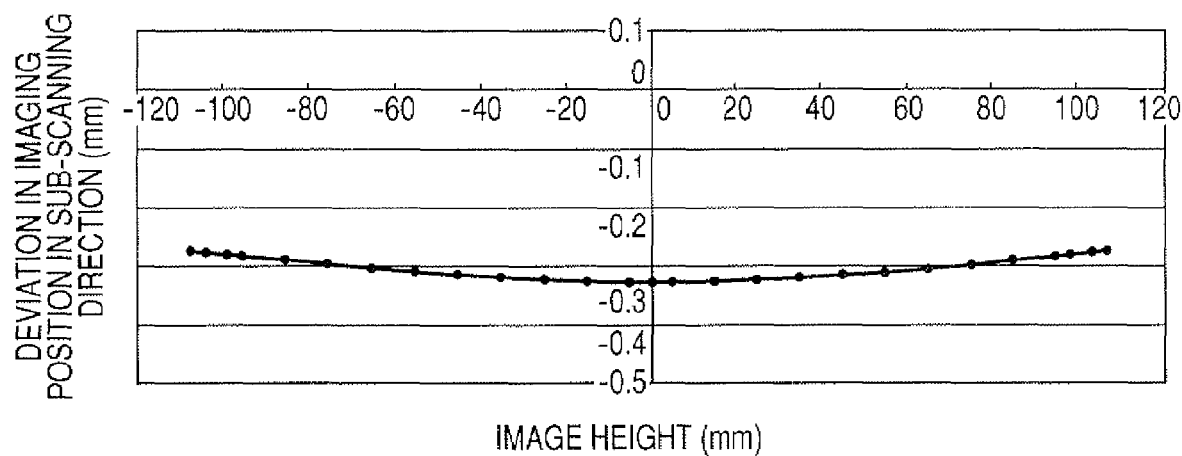
FIG. 19 is a graph showing deviations in the imaging position in the sub scanning direction that occur with an error in the angle of a mirror in the comparative example.

As described before, an error in the mount angle of the mirror 5 is likely to occur especially in the sub scanning direction. Here, a case in which the mirror is mounted with an upward angle error of 30' in the sub scanning direction will be discussed. FIG. 18 shows deviations of the imaging position in the sub scanning direction on the photosensitive drum surface 8 that occur in the above mentioned case in the first embodiment. FIG. 19 shows deviations of the imaging position in the sub scanning direction on the photosensitive drum surface 8 that occur in the above mentioned case in the comparative example.

In the first embodiment, deviations in the imaging position in the sub scanning direction on the photosensitive drum surface 8 do not occur even when there is an error in the angle of the mirror 5 in the sub scanning direction, since the mirror 5 and the photosensitive drum surface 8 are arranged to be conjugate with each other with respect to the fθ lens 7. Therefore, deviations in the imaging position in the sub scanning direction are zero as shown in FIG. 18.

On the other hand, in the case of the comparative example, an error in the angle of the mirror 5 in the sub scanning direction leads to a deviation of the imaging position on the photosensitive drum surface 8 in the sub scanning direction, since the deflection surface 6a and the photosensitive drum surface 8 are conjugate with each other with respect to the fθ lens 7. The deviation is as large as approximately 0.3 mm as shown in FIG. 19. Therefore, in the case of the comparative example, it is necessary that the error in the angle of the mirror 5 in the sub scanning direction be corrected in each apparatus.

In contrast, it is not necessary in the embodiment to adjust the angle of the mirror 5 with respect to the sub scanning direction. Therefore, it is possible to reduce the manufacturing cost.

In the case of the first embodiment, the mirror 5 and the photosensitive drum surface 8 are arranged to be conjugate with each other with respect to the fθ lens 7, but it is not necessary that the beam convergence position (point P) in the sub scanning cross section be arranged strictly on the mirror 5.

Typically, deviations in the imaging position in the sub scanning direction on the photosensitive drum surface 8 are restricted to about 0.2 mm or less, and the beam convergence position (point P) in the sub scanning cross section may be displaced from the mirror 5 as long as deviations in the imaging position are kept within the aforementioned range.

Figure 20:
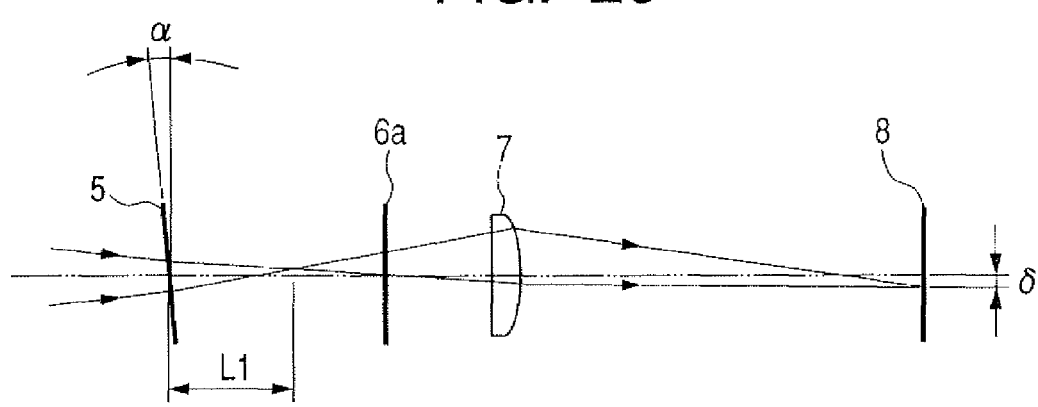
FIG. 20 is a diagram for illustrating a deviation of the imaging position in the sub scanning direction that occurs with an error in the angle of the mirror.

For example, the deviation δ in the imaging position in the sub scanning direction on the photosensitive drum surface 8 is expressed as follows:

$$\delta = L1 \times \tan(2\alpha) \times \beta$$

where, as shown in FIG. 20, L1 is the distance from the mirror 5 to the beam convergence position (point P) in the sub scanning cross section, α is an error in the angle of mirror 5 in the sub scanning direction and β is the imaging magnification of the fθ lens 7 in the sub scanning cross section.

When the mirror 5 is mounted on the housing of the optical scanning apparatus without adjustment, an angle error of about 30' occurs in typical cases. Substituting 30' for α in the above equation and introducing the condition that the deviation δ of the imaging position in the sub scanning direction on the photosensitive drum 8 is equal to or smaller than 0.2 mm give the following condition.

$$L1 \times \beta \leq 11.46 \text{ (mm)} \tag{6}$$

The distance L1 from the mirror 5 to the beam convergence position (point P) in the sub scanning cross section and the imaging magnification β of the fθ lens 7 in the sub scanning cross section may be determined in such a way that the above formula (6) is satisfied. Thus, the apparatus can be manufactured without the need for adjustment of the angle of mirror 5 in the sub scanning direction.

Although the imaging optical system 7 in this embodiment is composed of a single imaging lens as an imaging optical element, the imaging optical system may be composed of, for example, two or more lenses.

<Image Forming Apparatus>

Figure 21:
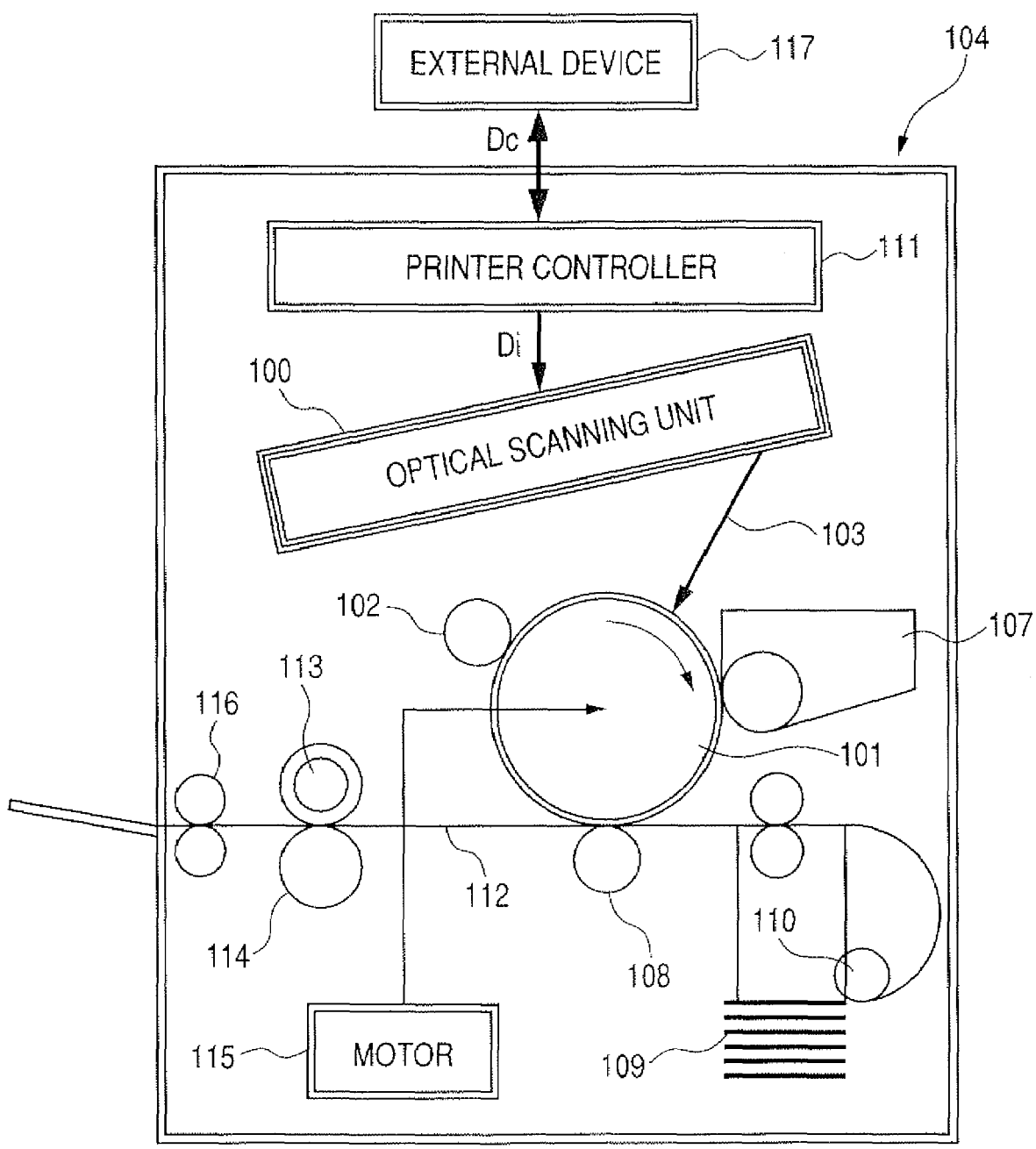
FIG. 21 is a sub scanning cross sectional view of an image forming apparatus according to an embodiment of the present invention.

FIG. 21 is a cross sectional view taken along the sub scanning direction of the relevant portion of an image forming apparatus according to an embodiment of the present invention. In FIG. 10, reference sign 104 designates an image forming apparatus. To the image forming apparatus 104 is input code data Dc from an external device 117 such as a personal computer. The code data Dc is converted into image data (dot data) Di by a printer controller 111 provided in the apparatus. The image data Di is input to an optical scanning unit 100 having a configuration as described in the first embodiment. The optical scanning unit 100 emits a light beam 103 modulated based on the image data Di, with which the photosensitive surface of the photosensitive drum 101 is scanned along the main scanning direction.

The photosensitive drum 101, which serves as an electrostatic latent image bearing member (or a photosensitive member) is rotated clockwise by a motor 115. With the rotation, the photosensitive surface of the photosensitive drum 101 moves relative to the light beam 103 in the sub scanning direction that is perpendicular to the main scanning direction. Above the photosensitive drum 101 is provided a charging roller 102 for charging the surface of the photosensitive drum 101 uniformly, the charging roller 102 being in contact with the drum surface. The surface of the photosensitive drum 101 that is charged by the charging roller 102 is irradiated with the light beam 103 with which the scanning is performed by the optical scanning unit 100.

As described above, the light beam 103 has been modulated based on the image data Di, and an electrostatic latent image is formed on the surface of the photosensitive drum 101 with irradiation with the light beam 103. The electrostatic latent image is developed into a toner image by developing device 107 that is arranged to be in contact with the photosensitive drum 101 at a position downstream of the light beam 103 irradiation position with respect to the direction of rotation of the photosensitive drum 101.

The toner image developed by the developing device 107 is transferred onto a paper sheet 112 serving as a material to be transferred by a transfer roller 108 that is arranged below the photosensitive drum 101 and opposed to the photosensitive drum 101. The paper sheet 112 is stored in a sheet cassette 109 provided in front (or in the right in FIG. 21) of the photosensitive drum 101. Alternatively, it may be fed manually. At an end of the sheet cassette 109 is provided a feed roller 110, which brings a paper sheet 112 in the sheet cassette 109 into the conveyance path.

The sheet 112 on which an unfixed toner image has been transferred in the above described manner is further conveyed to a fixing device provided in the rear (in the left in FIG. 21) of the photosensitive drum 101. The fixing device is composed of a fixing roller 113 inside which a fixing heater (not shown) is provided and a pressure roller 114 that is adapted to be in pressure contact with the fixing roller 113. The sheet 112 conveyed from the transfer portion is heated under a pressurized state in the portion in which the fixing roller 113 and the pressure roller 114 are in pressure contact, whereby the unfixed toner image on the sheet 112 is fixed. Furthermore, in the rear of the fixing roller 113 is provided a discharge roller 116, which discharges the sheet 112 with a fixed image to the exterior of the image forming apparatus.

The printer controller 111 not only performs the data conversion mentioned before but also controls various parts such as the motor 115 in the image forming apparatus and a motor of an optical scanning unit that will be described later, though not shown in FIG. 21.

There is no particular limitation on the resolution of the image forming apparatus used with the present invention. However, in view of the fact that the higher the resolution of an image forming apparatus is, the higher image quality it is required to have, the configuration according to the first embodiment of the present invention is more advantageous in image forming apparatuses with a resolution higher than or equal to 1200 dpi.

<Color Image Forming Apparatus>

Figure 22:
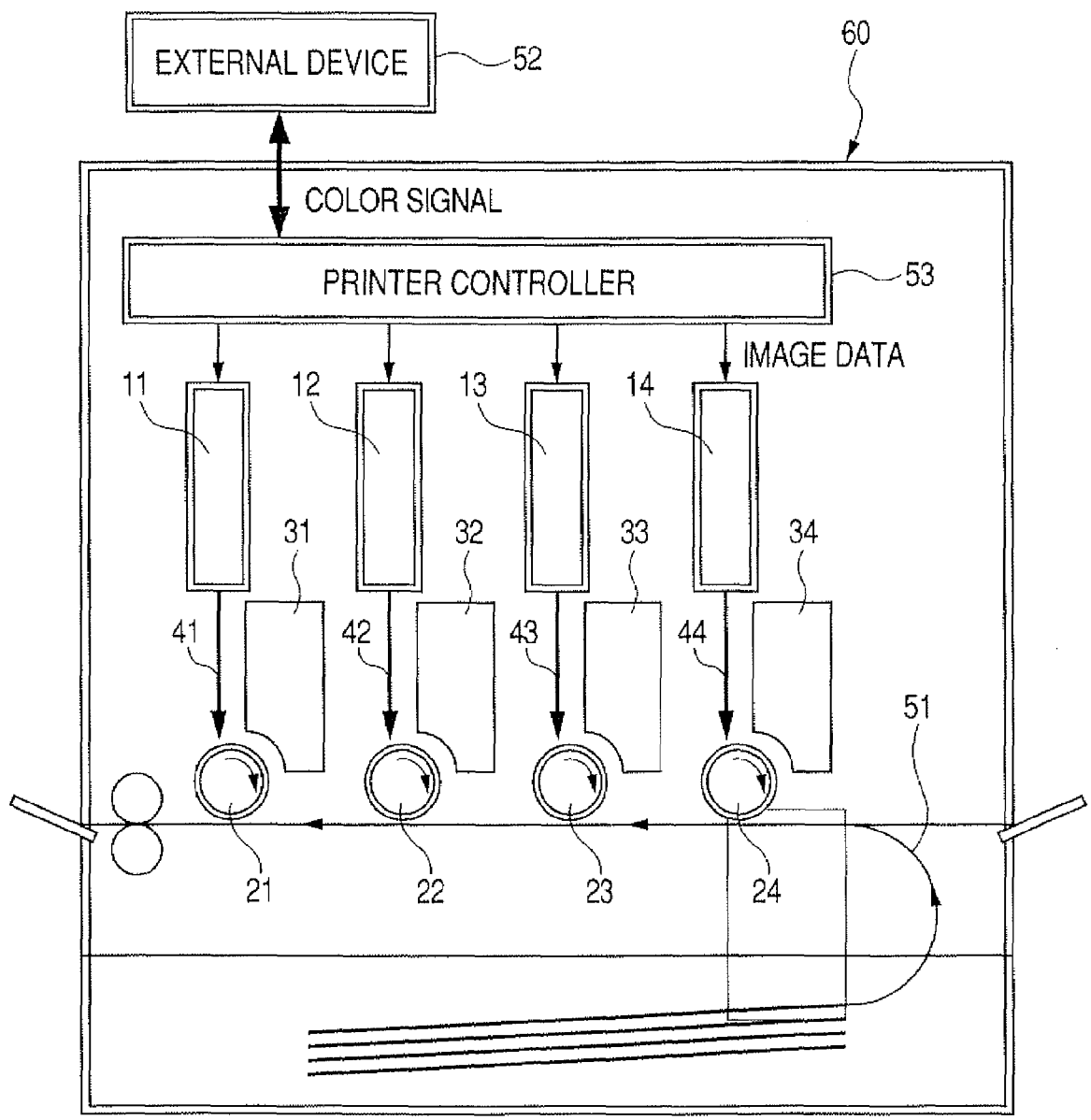
FIG. 22 is a sub scanning cross sectional view of a color image forming apparatus according to an embodiment of the present invention.

FIG. 22 is a schematic diagram of the relevant portion of a color image forming apparatus according to an embodiment of the present invention. The apparatus according to this embodiment is a color image forming apparatus of a tandem type in which four optical scanning apparatuses (optical scanning optical systems) are arranged in parallel to simultaneously record image information on the surfaces of photosensitive drums serving as image bearing members. The color image forming apparatus 60 shown in FIG. 22 has optical scanning apparatuses 11, 12, 13 and 14, each of which has the configuration same as that in the first embodiment, photosensitive drums 21, 22, 23 and 24 serving as image bearing members, developing devices 31, 32, 33 and 34 and a transfer belt 51. The apparatus shown in FIG. 22 further has a transferring device (not shown) that transfers toner images developed by the developing devices onto a material to be transferred and a fixing device (not shown) that fixes the transferred toner images on the material to be transferred.

To the color image forming apparatus 60 shown in FIG. 22 is input color signals of R (red), G (green) and B (blue) from an external device such as a personal computer. The color signals are converted by a printer controller 53 provided in the apparatus into image data (dot data) of C (cyan), M (magenta), Y (yellow) and B (black). The image data are respectively input to the corresponding optical scanning apparatuses 11, 12, 13 and 14. The optical scanning apparatuses emit light beams 41, 42, 43 and 44 modulated based on the respective image data, and the photosensitive surfaces of the photosensitive drums 21, 22, 23 and 24 are scanned with these light beams long the main scanning direction.

The color image forming apparatus according to this embodiment has four optical scanning apparatuses (11, 12, 13, and 14) that are arranged side by side and associated with respective colors of C (cyan), M (magenta), Y (yellow) and B (black). They record image signals (image information) on the surfaces of the photosensitive drums 21, 22, 23 and 24 to print a color image at high speed.

As described above, in the color image forming apparatus according to this embodiment, latent images of respective colors are formed by the four optical scanning apparatuses 11, 12, 13, 14 on the surfaces of the corresponding photosensitive drums 21, 22, 23, 24 using light beams generated based on respective image data. Thereafter, images are transferred in a superposed manner onto a recording material, whereby a single full-color image is formed.

The aforementioned external device 52 may be, for example, a color image reading apparatus equipped with a CCD sensor. In this case, the color image reading apparatus and the color image forming apparatus 60 can constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-038155, filed Feb. 15, 2006 which is hereby incorporated by reference herein in its entirety.

What is claimed is:

1. An optical scanning apparatus comprising:
   light source means;
   a condense optical system that condenses a light beam emitted from said light source means;
   an optical deflector that deflects a light beam emergent from said condense optical system for scanning; and
   an imaging optical system that images the light beam deflected and scanned by a deflection surface of said optical deflector on a surface to be scanned,
   wherein said imaging optical system comprises at least one imaging optical element made of plastic,
   wherein said optical deflector has a function of moving the deflection surface back and forth in a main scanning direction,
   the light beam emergent from said condense optical system converges in a sub scanning cross section, the convergence position being in an optical path between said condense optical system and the deflection surface of the optical deflector, and
   the following condition is satisfied:

$$L2(\text{mm}) = 0.61 \frac{D}{\lambda \beta}$$

where, L2 (mm) represents the distance from the convergence position of the light beam emergent from the condense optical system in the sub scanning cross section to the deflection surface of said optical deflector, β represents the imaging magnification of said imaging optical system in the sub scanning cross section, D (mm) represents the diameter of an image spot imaged on said surface to be scanned in the sub scanning direction, and λ represents the wavelength of the light beam emitted from said light source means.

2. An optical scanning apparatus according to claim 1, wherein said optical deflector is a resonance optical deflector in which the deflection surface of the optical deflector is driven by resonance drive.

3. An image forming apparatus comprising an optical scanning apparatus according to claim 1, a photosensitive member disposed at said surface to be scanned, a developing device that develops an electrostatic latent image formed on said photosensitive member by a light beam scanned by said optical scanning apparatus as a toner image, a transferring device that transfers the developed toner image onto a material to be transferred, and a fixing device that fixes the transferred toner image on the material to be transferred.

4. An image forming apparatus comprising an optical scanning apparatus according to claim 1, and a printer controller that converts code data input from an external device into an image signal and input it to said optical scanning apparatus.

5. An optical scanning apparatus according to claim 1, a width of a deflection surface of the optical deflector in the sub-scanning direction is equal to or smaller than 1 mm.

6. An optical scanning apparatus comprising:
   light source means,
   a condense optical system that condenses a light beam emitted from said light source means;
   an optical deflector that deflects a light beam emergent from said condense optical system for scanning;
   an imaging optical system that images the light beam deflected and scanned by a deflection surface of said optical deflector on a surface to be scanned; and
   a mirror provided in an optical path between said condense optical system and said optical deflector,
   wherein said optical deflector has a function of moving the deflection surface back and forth in a main scanning direction,
   wherein the light beam emergent from said condense optical system converges in a sub scanning cross section, the convergence position being in an optical path between said condense optical system and the deflection surface of the optical deflector, and
   wherein the following condition is satisfied:

$L1 \times \beta \leq 11.46$ (mm)

where L1 (mm) represents the distance from the mirror to the convergence position of the light beam emergent from the condense optical system in the sub scanning cross section, and β represents an imaging magnification of said imaging optical system in the sub scanning cross section.

7. An optical scanning apparatus according to claim 6, wherein said imaging optical system comprises at least one imaging optical element made of plastic.

8. An image forming apparatus, comprising:
   an optical scanning apparatus according to claim 6;
   a photosensitive member disposed at said surface to be scanned, a developing device that develops an electrostatic latent image formed on said photosensitive member by a light beam scanned by said optical scanning apparatus as a toner image;
   a transferring device that transfers the developed toner image onto a material to be transferred; and
   a fixing device that fixes the transferred toner image on the material to be transferred.

9. An image forming apparatus, comprising:
   an optical scanning apparatus according to claim 6; and
   a printer controller that converts code data input from an external device into an image signal and input it to said optical scanning apparatus.

* * * * *